United States Patent [19]
Meeker

[11] Patent Number: 6,073,185
[45] Date of Patent: Jun. 6, 2000

[54] PARALLEL DATA PROCESSOR

[75] Inventor: Woodrow L. Meeker, Orlando, Fla.

[73] Assignee: TeraNex, Inc., Orlando, Fla.

[21] Appl. No.: 08/112,540

[22] Filed: Aug. 27, 1993

[51] Int. Cl.[7] .................................................. G06F 13/00
[52] U.S. Cl. ................................................................ 710/1
[58] Field of Search ...................... 295/800; 364/DIG. 1, 364/DIG. 2, 231.9, 260

[56] References Cited

U.S. PATENT DOCUMENTS

| | | | |
|---|---|---|---|
| 3,287,703 | 11/1966 | Slotnick ................. | 340/172.5 |
| 3,643,236 | 2/1972 | Kolankowsky et al. ........... | 340/173 |
| 3,815,095 | 6/1974 | Wester ........................... | 340/172.5 |
| 4,167,780 | 9/1979 | Hayashi ........................ | 364/200 |
| 4,187,551 | 2/1980 | Nutter et al. .................... | 364/900 |
| 4,215,401 | 7/1980 | Holsztynski et al. ........... | 364/200 |
| 4,309,755 | 1/1982 | Lanty ........................... | 364/200 |
| 4,314,349 | 2/1982 | Batcher ........................ | 364/716 |
| 4,384,273 | 5/1983 | Ackland et al. ................ | 382/34 |
| 4,489,381 | 12/1984 | Kavakkee et al. .............. | 364/200 |
| 4,507,726 | 3/1985 | Grinberg et al. ............... | 364/200 |
| 4,511,967 | 4/1985 | Witalka et al. ................ | 364/200 |
| 4,517,659 | 5/1985 | Chamberlain ................... | 364/900 |
| 4,524,455 | 6/1985 | Holsztynski et al. ........... | 364/200 |
| 4,533,993 | 8/1985 | McCanny et al. ............... | 364/200 |
| 4,541,115 | 9/1985 | Werth .......................... | 282/14 |
| 4,546,428 | 10/1985 | Morton ......................... | 364/200 |
| 4,573,116 | 2/1986 | Ong et al. ..................... | 364/200 |
| 4,574,394 | 3/1986 | Holsztynski et al. ........... | 382/41 |
| 4,628,481 | 12/1986 | Reddaway ...................... | 364/900 |
| 4,635,292 | 1/1987 | Mori et al. ..................... | 382/41 |
| 4,660,155 | 4/1987 | Thaden et al. .................. | 364/521 |
| 4,667,308 | 5/1987 | Hayes et al. ................... | 364/200 |
| 4,720,780 | 1/1988 | Dolecek ........................ | 364/200 |
| 4,739,474 | 4/1988 | Holsztynski ................... | 364/200 |
| 4,739,476 | 4/1988 | Fiduccia ........................ | 364/200 |
| 4,752,893 | 6/1988 | Guttag et al. .................. | 364/518 |
| 4,769,779 | 9/1988 | Chang et al. ................... | 364/754 |
| 4,884,190 | 11/1989 | Ngai et al. ..................... | 364/200 |

(List continued on next page.)

FOREIGN PATENT DOCUMENTS

| | | |
|---|---|---|
| 0 223 690 | 5/1987 | European Pat. Off. . |
| 0 237 218 | 9/1987 | European Pat. Off. . |
| WO90/04235 | 4/1990 | European Pat. Off. . |
| 0539595 A1 | 5/1993 | European Pat. Off. . |
| WO86/03038 | 5/1986 | WIPO . |

OTHER PUBLICATIONS

PCT International Search Report issued May 22, 1995 in connection with a counterpart PCT application No. PCT/US 94/10332.

(List continued on next page.)

*Primary Examiner*—Paul R. Myers
*Attorney, Agent, or Firm*—Burns, Doane, Swecker & Mathis, L.L.P.

[57] ABSTRACT

A parallel processor has a controller for generating control signals, and a plurality of identical processing cells, each of which is connected to at least one neighboring cell and responsive to the controller for processing data in accordance with the control signals. Each processing cell includes a memory, a first register, a second register, and an arithmetic logic unit (ALU). An input of the first register is coupled to a memory output. The output of the first register is coupled to a second register located in a neighboring cell. An input of the second register is coupled to receive an output from a first register located in a neighboring cell. The output of the second register is coupled to an input of the ALU. In another feature, mask logic is interposed between A and B operand sources, and two inputs of the ALU. The mask logic also inputs a mask source, and in response to control signals, can output the A operand logically OR'ed with the mask, and can output the B operand logically AND'ed with the mask. In another feature, each cell includes a multiplexor coupled to a neighboring cell for selectively transmitting cell data to the neighbor, or for effectively bypassing the cell during data shift operations by transmitting data that is received from a neighboring cell to a neighboring cell. Other enhancements to a cell architecture are also disclosed.

29 Claims, 15 Drawing Sheets

U.S. PATENT DOCUMENTS

| | | | |
|---|---|---|---|
| 4,933,846 | 6/1990 | Humphrey et al. | 364/200 |
| 5,038,282 | 8/1991 | Gilbert et al. | 364/200 |
| 5,095,527 | 3/1992 | Uramoto et al. | 395/800 |
| 5,179,714 | 1/1993 | Graybill | 395/800 |
| 5,276,819 | 1/1994 | Rau et al. | 395/375 |
| 5,421,019 | 5/1995 | Holsztynski et al. | 395/800 |

OTHER PUBLICATIONS

W.F. Wong & K.T. Lua, "A preliminary evaluation of a massively parallel processor: GAPP," *Microprocessing and Microprogramming*, pp. 53–62, vol. 29, No. 1, Jul. 1990, Amsterdam, NL.

A. Alcolea et al., "FAMA Architecture: Implementation details," *Proceedings of IECON '87: 1987 International Conference on Industrial Electronics, Control, and Instrumentation*, pp. 737–744, vol. 2, Nov. 3–6, 1987, Cambridge, Massachusetts.

A. Boubekeur et al., "A Real Experience on Configuring a Wafer Scale 2–D Array of Monobit Processors," *IEEE Transactions on Components, Hybrids, and Manufacturing Technology*, pp. 637–644, vol. 16, No. 7, Nov. 1993, New York, U.S.

Burkley, John T., *MPP VLSI Multiprocessor Integrated Circuit Design*, published in *The Massively Parallel Processor*, pp. 206–216, ed. J.L. Potter, (MIT Press, 1985).

The publication "Processing Element and Custom Chip Architecture for the BLITZEN Massively Parallel Processor", Donald W. Blevins, et al., Technical Report TR87–22, pp. 1–27, published Oct. 22, 1987, by The Microelectronics Center of North Carolina.

The publication "Parallel Supercomputing in SIMD Architectures", R. Michael Hord, pp. 85–90; 143–149; 205–217; 312–324; and 356–359, published 1990 by CRC Press.

The publication "The Image Understanding Architecture", Charles C. Weems et al., pp. 21–27, COINS Technical Report 87–76.

The publication "Architecture Descriptions for the Massively Parallel Processor (MPP) and the Airborne Associative Processor (ASPRO)", by John Smit, published Aug. 8, 1980 by Goodyear Aerospace Corporation GER–16785.

The publication "An Evaluation of Some Chips for Image Processing", by T. J. Fountain for University College London, Department of Physics and Astronomy.

The publication for NCR, "Geometric Arithmetic Parallel Processor", Model No. NCR45CG72.

The article "Calculateur Cellulaire Universel Destine a L'Etude Des Structures Cellulaires Specialisees", by J. R. Rochez, appearing in *Digital Processes*, vol. 3, No. 2, pp. 121–138 (1977).

The article "Interconnect Strategies for Fault Tolerant 2D VLSI Arrays", by P. Franzon appearing in *IEEE International Conference on Computer Design: VLSI in Computers* pp. 230–233, Oct. 1986.

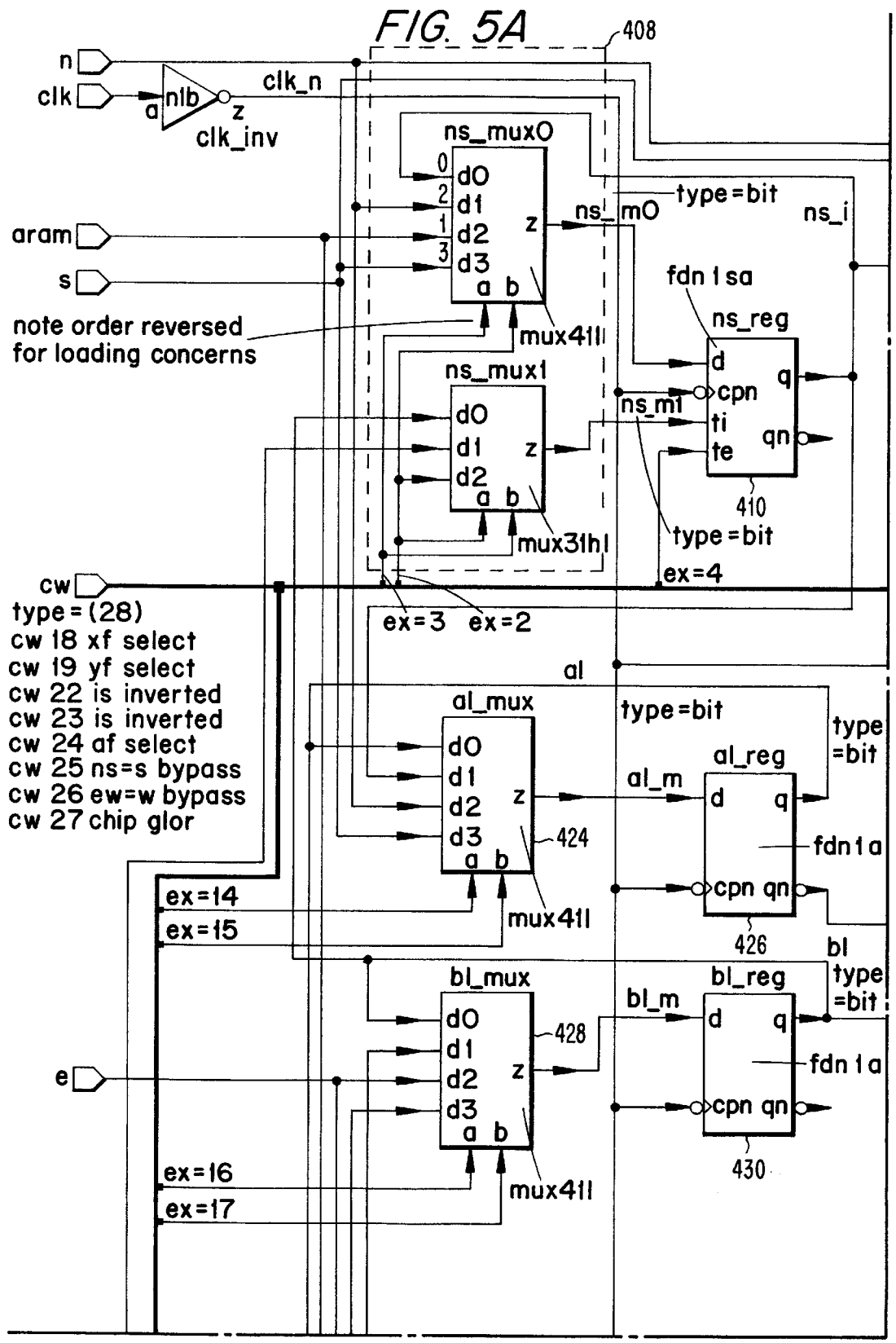

PARALLEL DATA PROCESSOR

BACKGROUND

The invention relates to a parallel processor integrated circuit component, and more particularly to a Single Instruction Multiple Data (SIMD) array processing unit. The invention further relates to a parallel processor that is constructed as a monolithic silicon Complementary Metal Oxide Semiconductor (CMOS) digital integrated circuit. The invention still further relates to a processing cell architecture for use in a parallel processor that is constructed as a monolithic CMOS digital integrated circuit.

In the field of digital signal processing of video image data, it is necessary to perform substantially identical logical or arithmetic operations on large amounts of data in a short period of time. The use of parallel processing to accomplish this is drawing increased attention. In parallel processing, an array of processor elements, or cells, is configured so that each cell performs logical or arithmetic operations on its own data at the same time that all other cells are processing their own data. Machines in which the logical or arithmetic operation being performed at any instant in time is identical for all cells in the array are referred to by several names, including Single Instruction-Multiple Data (SIMD) machines.

A common arrangement for such a machine is as a rectangular array of cells, with each interior cell connected to its four nearest neighboring cells (designated north, south, east and west) and each edge cell connected to a data input/output device. Each cell is connected as well to a master controller which coordinates operations on data throughout the array by providing appropriate instructions to the processing elements. Such an array proves useful, for example, in high resolution image processing. The image pixels comprise a data matrix which can be loaded into the array for quick and efficient processing.

Although SIMD machines may all be based upon the same generic concept of an array of cells all performing the same function in unison, parallel processors vary in details of cell design. For example, U.S. Pat. No. 4,215,401 to Holsztynski et al. discloses a cell which includes a random access memory (RAM), a single bit accumulator, and a simple logical gate. The disclosed cell is extremely simple and, hence, inexpensive and easily fabricated. A negative consequence of this simplicity, however, is that some computational algorithms are quite cumbersome so that it may require many instructions to perform a simple and often repeated task.

U.S. Pat. No. 4,739,474 to Holsztynski et al., represents a higher level of complexity, in which the logic gate is replaced by a full adder capable of performing both arithmetic and logical functions. This increase in the complexity of the cell's computational logic allows fewer cells to provide higher performance.

It is important to note that the substitution of a full adder for a logic gate, while superficially simple, is in reality a change of major consequence. The cell structure cannot be allowed to become too complex. This is because in a typical array, the cell will be repeated dozens if not hundreds of times. The cost of each additional element in terms of money and space on a VLSI chip is therefore multiplied many times. It is therefore no simple matter to identify those functions that are sufficiently useful to justify their incorporation into the cell. It is similarly no simple matter to implement those functions so that their incorporation is not realized at too high a cost.

Parallel processors may also vary in the manner of cell interconnection. As mentioned above, cells are typically connected to their nearest physical neighbors. All cells except those at the edge of the entire array are typically connected to four neighbors. However, the provision of alternate paths of interconnection may produce additional benefits in the form of programmable, flexible interconnection between cells.

An object of the invention is to improve computation speed in a SIMD processor.

Another object is to optimize the use of a cell RAM in a SIMD processor.

A further object of the invention is to improve the ease with which a SIMD processor is controlled.

SUMMARY

According to the present invention, the foregoing and other objects are attained in a parallel processor having control means for generating control signals and a plurality of identical processing cells, by providing, in each cell, a first register holding data to be shifted to a neighboring cell, and a second register for receiving data from a neighboring cell. The first register loads its data from a memory source within the cell. The second register provides an operand to an arithmetic logic unit (ALU). This arrangement increases computation speed by allowing the first register to load data to be shifted to a neighboring cell, while in the same clock cycle allowing the second register to receive data from a neighboring cell.

In accordance with another aspect of the invention, each cell has an ALU having three inputs coupled to respective first, second, and carry-bit sources. The ALU output selectively represents either a carry or a borrow result from, respectively, the addition and subtraction of the three inputs, in response to a control signal generated by the control means.

In accordance with yet another aspect of the invention, each cell has a direct coupling between a carry output from an ALU, and an addressable memory means.

In accordance with a further aspect of the invention, the parallel processor has means for generating a global signal from a plurality of cell signals, each cell signal being generated by one of the plurality of identical processing cells. Each cell further includes memory means coupled to receive and store the global signal from the global signal generating means in response to a control signal generated by the control means.

In accordance with a still further aspect of the invention, each cell has an addressable memory means coupled to receive an input from the output of a multiplexor. The multiplexor has a plurality of inputs connected to respective sources of data. Each cell further has a register coupled to receive the output of the multiplexor in response to a control signal generated by the control means. This arrangement allows the register to obtain a copy of the data being written to the addressable memory means without waiting an extra cycle to read that data from the memory.

In accordance with another aspect of the invention, each cell has mask logic means interposed between an ALU and two of its operand sources. The mask logic input includes a mask from a mask source, in addition to the first and second operands. The mask logic has a first output coupled to the ALU first input, and a second output coupled to the ALU second input. A first control signal determines whether the first output contains the first operand, or whether it contains the first operand logically OR'ed with the mask. A second control signal determines whether the second output contains the second operand, or whether it contains the second operand logically AND'ed with the mask. This arrangement is especially usefully for performing conditional add and subtract operations (ADDIF, SUBIF), and for selecting one of two inputs in response to the logic state of a mask operand (FORK operations).

In accordance with a further aspect of the invention, each cell has means for generating a signal indicative of the equality of first and second multibit operands. This signal may advantageously be generated by providing a first signal indicating the equality of selected bits from the first and second operands, and a means for storing a value which indicates the equality of previously compared bits from the first and second operands. This storage means provides a second signal and is updated by comparing the first signal to the currently stored value and changing its value to indicate inequality if the first signal indicates that the two current operand bits are unequal. After all of the bits of the multibit operands have been compared, the second signal is indicative of the equality of the first and second multibit operands. The means for generating the second signal may be a logical OR gate.

In accordance with a still further aspect of the invention each cell has a multiplexor for bypassing the cell in response to a control signal. The multiplexor has a first input coupled to an output of a multiplexor in one of the neighboring cells, and a second input coupled to a local data source. The output of the multiplexor is coupled to a first input of a bypass multiplexor in a neighboring cell. This feature is especially useful for providing fault tolerance in the processor array. If a fault is detected in any cell, the bypass multiplexor allows the row or column containing the faulty cell to be bypassed, thus preventing it from contributing faulty data.

BRIEF DESCRIPTION OF THE DRAWINGS

The objects and advantages of the invention will be understood by reading the following detailed description in conjunction with the drawings in which.

DETAILED DESCRIPTION

Figure 1:
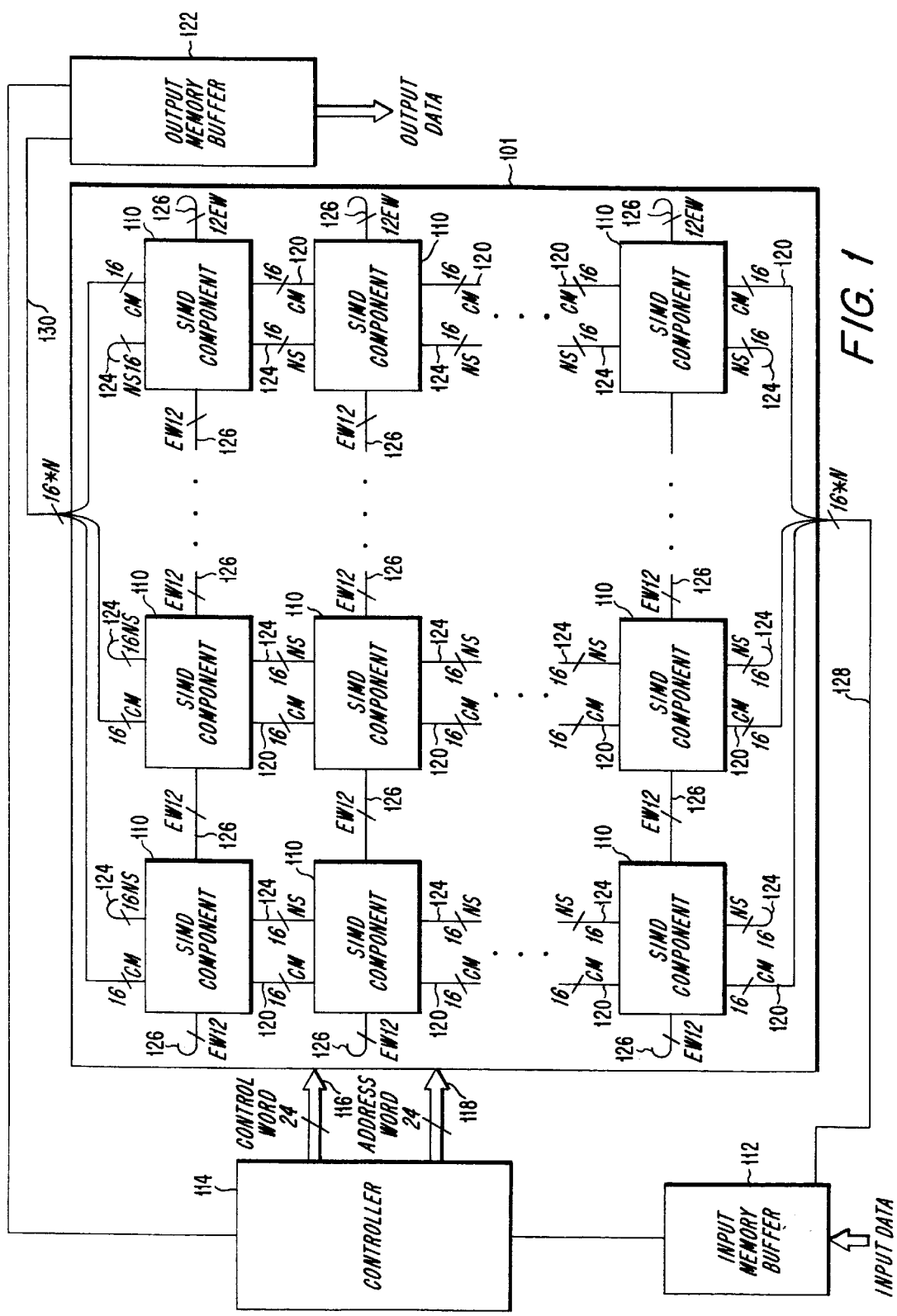
FIG. 1 is a block diagram of a parallel processor array in accordance with the present invention.
Figure 6:
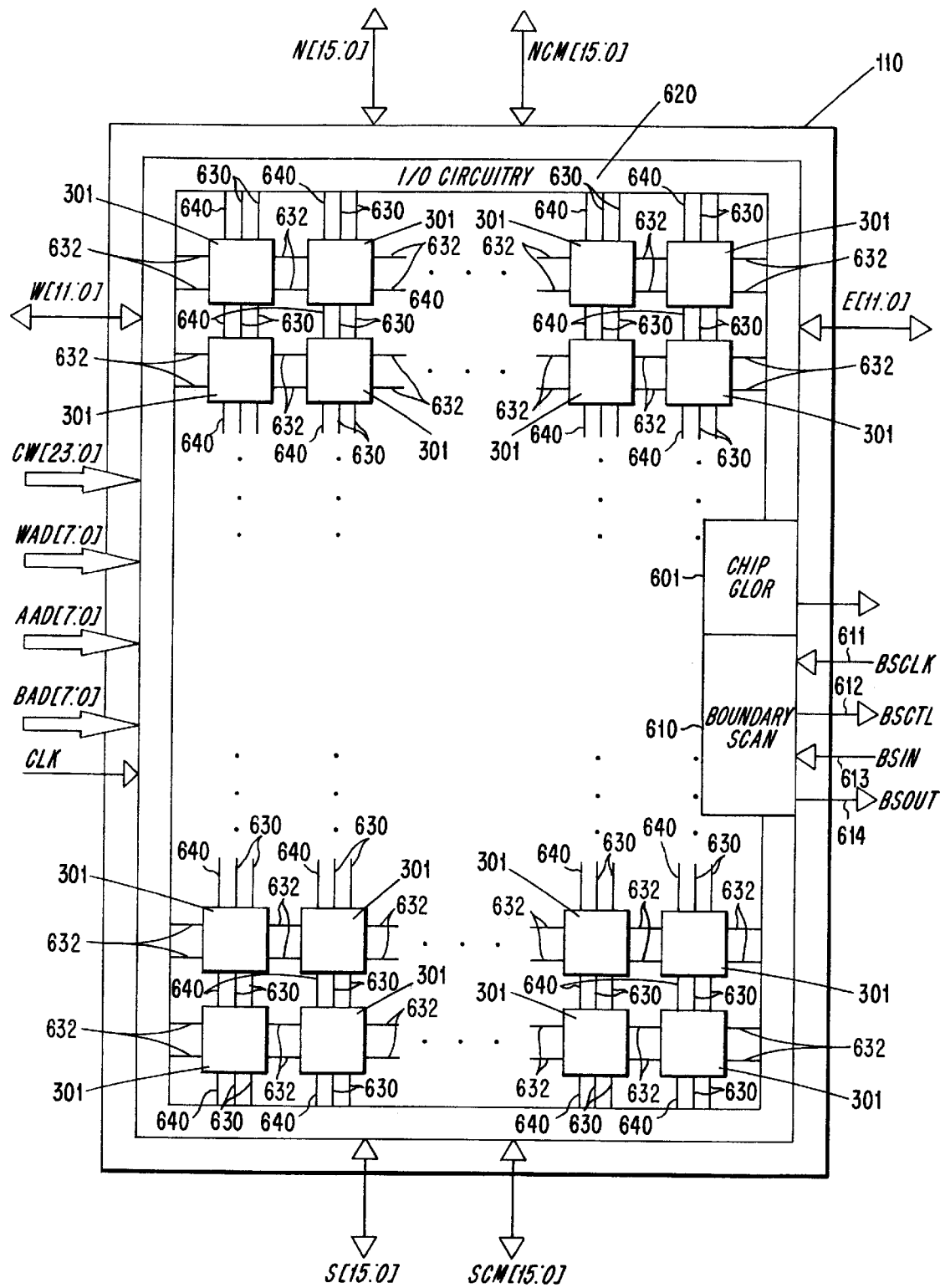
FIG. 6 shows a SIMD component containing a matrix of identical processing cells, in accordance with an embodiment of the present invention.

Referring now to FIGS. 1 and 6, a parallel processor array 101 is shown which comprises an M row by N column matrix of Single Instruction Multiple Data (SIMD) components 110, each of which contains a matrix of identical processing cells 301 (see FIG. 6). In a parallel processor having a SIMD architecture, a common program instruction is sent to all of the processing elements, causing them to execute the same instruction at the same time. However, each processing element need not perform this operation on identical sets of data. Thus, the same task may concurrently be performed on multiple sets of data.

In the preferred embodiment, each SIMD component 110 is a SIMD architecture parallel processor containing 192 processing cells 301 which are arranged in a 16 column by 12 row rectangular matrix. Each processing cell 301 that does not lie on the perimeter of the matrix is coupled to communicate data with four neighboring processing cells 301, which are referred to, respectively, as the north, south, east, and west neighbors. Processing cells 301 that are located on the perimeter of the matrix may be coupled to perimeter processing cells 301 located in an adjacent SIMD component 110 (in order to increase the effective size of the array). Alternatively, a perimeter processing cell 301 may be "wrapped around" to connect with a perimeter processing cell 301 located in a SIMD component 110 con the opposite side of the parallel processor array 101. Another alternative is to connect a perimeter processing cell 301 to an external device, as will be described below.

As previously stated, the parallel processor array 101 shown in FIG. 1 is comprised of N*M SIMD components 110, organized as a matrix of N columns and M rows. Because each SIMD component 110 is, itself, made up of 192 processing cells 301 (16 columns*12 rows), the parallel processor array 101 can process (16*N)*(12*M) data items in parallel. This array may cover several circuit cards.

One use for the parallel processor array 101 is in the digital signal processing of video image data. When used for this purpose, the SIMD components 110 receive input video image data from an input memory buffer 112. Each word of digital data that is stored in the input memory buffer 112 may represent the digitized intensity of a single pixel. Input data is loaded from the input memory buffer 112 into the SIMD component array by means of an Array South Communications Bus (Array SCM Bus) 128 which is (16*N) bits wide. The Array SCM Bus 128 is connected to N 16-bit wide Component South Communications Buses (Component SCM Buses) 221 (see FIG. 2). Each of the 16-bit wide Component SCM Buses 221 is, in turn, connected to 16 South Communication (SCM) buses 310. Each SCM bus 310 provides a pathway for data to be input to the south side of a single processing cell 301.

Each processing cell 301 may output a single bit of data per clock cycle to its northern neighbor by means of a North Communication (NCM) bus 312. The link between one processing cell's NCM bus 312 and a northern neighboring processing cell's SCM bus 310 is shown in FIG. 6 as the internal Communications Bus (internal CM) 640.

At the northern-most row of processing cells 301 within a SIMD component 110, the sixteen NCM buses 312 are output as a 16-bit wide Component Communications Bus (Component NCM bus) 220. Within the parallel processor array 101, SIMD components 110 are linked to one another by connecting the Component NCM bus 220 output of one SIMD component 110 to the Component SCM bus 221 input of a north neighboring SIMD component 110. This link is shown in FIG. 1 as the intercomponent Communications Bus 120.

The discussion now continues with the example of loading data into the parallel processor array 101. During a first shift operation, 16*N bits are placed on the Array SCM bus 128 to be clocked into the southern-most row of processing cells 301 located within the southern-most row of SIMD components 110. During the next clock cycle, this data is shifted, via the internal CM bus 640, into the row of processing cells 301 which are immediately to the north of the southern-most row, while the southern-most row receives another set of 16*N bits from the Array SCM Bus 128. On the thirteenth clock cycle, the data makes its way, via the Intercomponent Communications Bus 120, to the southern-most row of processing cells 301 which are located within the row of SIMD components 110 immediately to the north of the southern-most row of SIMD components 110. This process continues with each row of processing cells 301 shifting data to its northern neighbor while it receives new data from the south. After 12*M clock cycles, the northern-most row of processing cells 301 in the northern-most row of SIMD components 110 has received data. Each processing cell 301 within each SIMD component 110 contains its own Random Access Memory (RAM) 434 (See FIG. 4) for storing the incoming data.

Output data is transferred from the parallel processor array 101 to an output memory 122 in a way which is analogous to the method of transferring data from the input memory buffer 112 to the parallel processor array 101. As a result, 12*M clock cycles are required to clock each bit plane from the parallel processor array 101 to the output memory buffer 122 by means of an Array North Communications Bus (Array NCM bus) 130.

Data is typically supplied to the array in bit plane form. A bit plane is defined for (16*N)*(12*M) data values, each of which is n bits wide, as the set of (16*N)*(12*M) bits, each coming from one of the n bit wide data values, that are of equal significance in their corresponding data values. For example, a bit plane may be formed from the least significant bits (LSBs) of each of the (16*N)*(12*M) data values. It is apparent, then, that there are n bit planes to be shifted into the array. Since each shift operation shifts in 16*N bits (the width of the South Communications Bus 128), shifting in an entire (16*N)*(12*M) bit plane takes 12*M clock cycles. Therefore, the total time to shift in one n bit pixel datum to all cells will be n*12*M clock cycles.

The arithmetic and logical operations that are associated with image processing algorithms often involve operations between adjacent pixels. As stated earlier, each SIMD component 110 is capable of processing 192 data elements in parallel. Because processing cells 301 are arranged in a rectangular array within each SIMD component 110, and because the SIMD components 110 themselves are arranged as a rectangular array within the parallel processor array 101, there is the need for a mechanism to transfer operand data between processing cells 301 and between SIMD components 110 in four directions (north, south, east, and west). To accomplish this, each processing cell can transfer data by means of two bidirectional bus systems. One of the buses is called the North/South (NS) bus 124. It is used to transfer data into or out of a processing cell 301 in either the north or south direction. The other bidirectional bus transfers direction into or out of a processing cell 301 in either the east or west direction, and is called the East/West (EW) bus 126. These two buses will be referred to, collectively, as the Image buses.

Although the NS bus 124 appears to be redundant with the inter-component CM bus 120, which also runs North/South, the ability to concurrently operate these buses allows data to be loaded into and/or out of the parallel processor array 101 (via the inter-component CM bus 120) while arithmetic and logical operands are transferred from one processing cell 301 to another along the NS bus 124. Consequently, arithmetic and logical operations may continue while new data is being shifted into or out of the parallel processor array 101.

The array, of SIMD components 110 is driven by a single controller 114 that provides microprogrammed instructions in the form of a command word. All 192 processing cells 301 within each SIMD component 110 concurrently perform the same input, output, logical, and arithmetic operations in response to the same command word supplied to the N-by-M array of SIMD components 110. Each processing cell 301 contains its own arithmetic logic unit (ALU). Due to the large number of cells on a single chip, these ALU's operate on single bit data.

Multi-bit data values, such as pixel values, are operated upon through iterative application of single bit operations. The controller 114 provides each processing cell with a series of command words to enable the single bit ALU to perform these multi-bit functions. A basic set of these multi-bit functions, called primitives, is described in a separate section below.

The controller 114 supplies one command word per clock cycle to the array of SIMD components 110. Each command word causes each processing cell 301 within each SIMD component 110 to execute a single bit operation. Each SIMD component 110 is completely driven by the external controller 114 and does not utilize any internal software, firmware or any other programmable commands.

Figure 2:
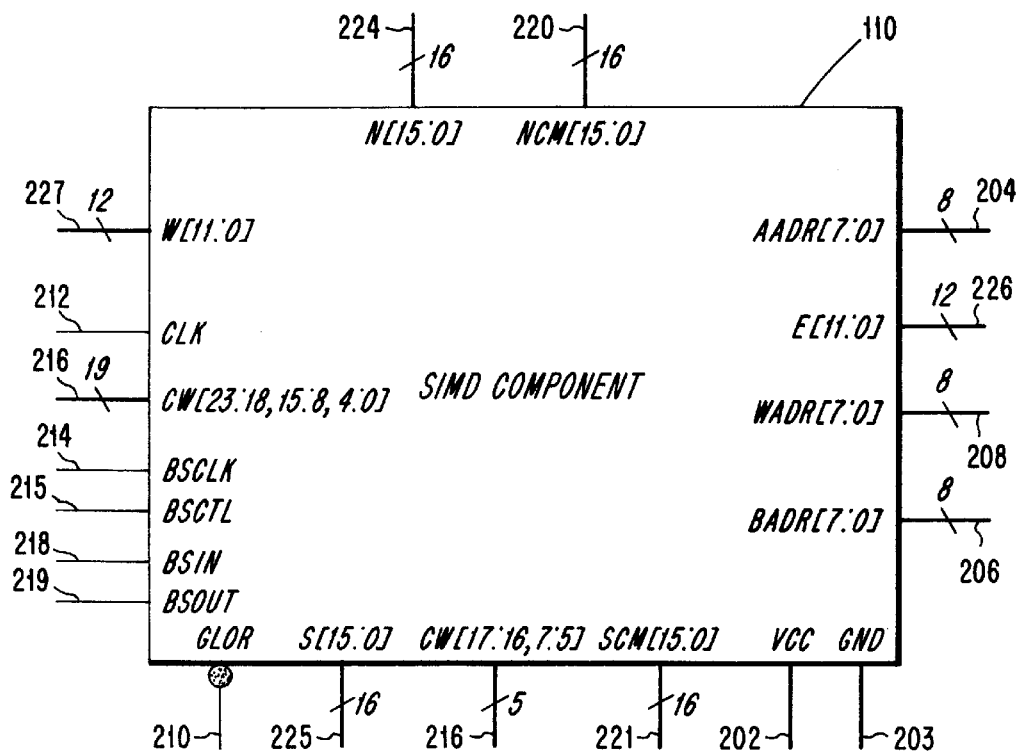
FIG. 2 shows the inputs and outputs of a SIMD component in accordance with the present invention.

Referring now to FIG. 2, the inputs and outputs of the SIMD component 110 are shown in greater detail.

The North Communications output bus (NCM) 220 is a sixteen bit unidirectional bus that provides a south to north data path between adjacent SIMD components 110, or between a SIMD component 110 and an output memory 122 when combined with other NCM buses 220 to form the 16-by-N bit wide North Communications Bus 130. Each of the sixteen bits corresponds to a column of processing cells 301 within the SIMD component 110. Data on the NCM 220 may originate in processing cell RAM 434, or other sources within the processing cell 301.

The South Communications input bus (SCM) 221 is a sixteen bit unidirectional bus that provides a south to north data path between adjacent SIMD components 110, or between a SIMD component 110 and an input memory 112. Each of the sixteen bits corresponds to a column of processing cells 301 within the SIMD component 110. Data on the SCM 221 may be stored in the processing cell RAM 434, or in other registers within the processing cell 301 by means of the RAM_MUX 406 and the CM_Reg 404.

The North image port (N) 224 is a sixteen bit bidirectional bus that provides a North/South bus connection to the SIMD component 110 located to the north in the parallel processing array 101. Each of the sixteen bits corresponds to a column of processing cells 301 within the SIMD component 110.

The South image port (S) 225 is a sixteen bit bidirectional bus that provides a North/South bus connection to the SIMD component 110 located to the south in the parallel processing array 101. Each of the sixteen bits corresponds to a column of processing cells 301 within the SIMD component 110.

The East image port (E) 226 is a twelve bit bidirectional bus that provides an East/West bus connection to the SIMD component 110 located to the east in the parallel processing array 101. Each of the twelve bits correspond to a row of processing cells 301 within the SIMD component 110.

The West image port (W) 227 is a twelve bit bidirectional bus that provides an East/West bus connection to the SIMD component 110 located to the west in the parallel processing array 101. Each of the twelve bits corresponds to a row of processing cells 301 within the SIMD component 110.

The Command Word (CW) 216 is a twenty four bit bus that provides control signals for the SIMD component 110 during each clock cycle. As shown in FIG. 2, the CW 216 is broken up into the high nine bits CW[23:15] 216, and the low fifteen bits CS[14:0] 216. This preferred arrangement is done only to facilitate routing of the command data to the SIMD component 110, and does not represent any logical segmenting of the command word, CW 216.

The A ADdRess bus (AADR) 204 is an eight bit bus that provides the RAM address for data to be read from the ARAM output of each cell's multi-port RAM 434.

The B ADdRess bus (BADR) 206 is an eight bit bus that provides the RAM address for data to be read from the BRAM output of each cell's multi-port RAM 434.

The Write ADdRess bus (WADR) 208 is an eight bit bus that provides the RAM address for data to be written to the write port of each cell's multi-port RAM 434.

A SIMD Component Global OR output signal (GLOR) 210 is provided. This signal is fully described below.

A CLocK input terminal (CLK) 212 is provided. The CLK 212 triggers data latching for all operational (non-boundary scan) registers within the SIMD component 110.

An input is provided for a Boundary Scan CLocK signal (BSCLK) 214. The BSCLK 214 triggers data latching for all boundary scan registers within the device.

An input is provided for a Boundary Scan ConTroL signal (BSCTL) 215. The BSCTL 215 signal is used to select between boundary scan instructions and data operands.

An input is provided for a Boundary Scan INput signal (BSIN) 218. The BSIN 218 input receives instructions and data for boundary scan operations.

A Boundary Scan OUTput (BSOUT) 219 provides resultant data from boundary scan operations.

Power is supplied to the SIMD component 110 through the VCC 202 pins. The ground pins are shown in FIG. 2 as the pins marked GND 203.

SIMD Component Hardware Definition

As shown in FIG. 6, the SIMD component 110 contains an internal array of 192 identical processing cells 301 arranged in a 16 column by 12 row rectangular configuration. The SIMD component 110 also contains chip GLOR hardware 601, boundary scan circuitry 610, and I/O circuitry 620. The following paragraphs describe each of these elements in detail.

Processing Cell

Figure 3:
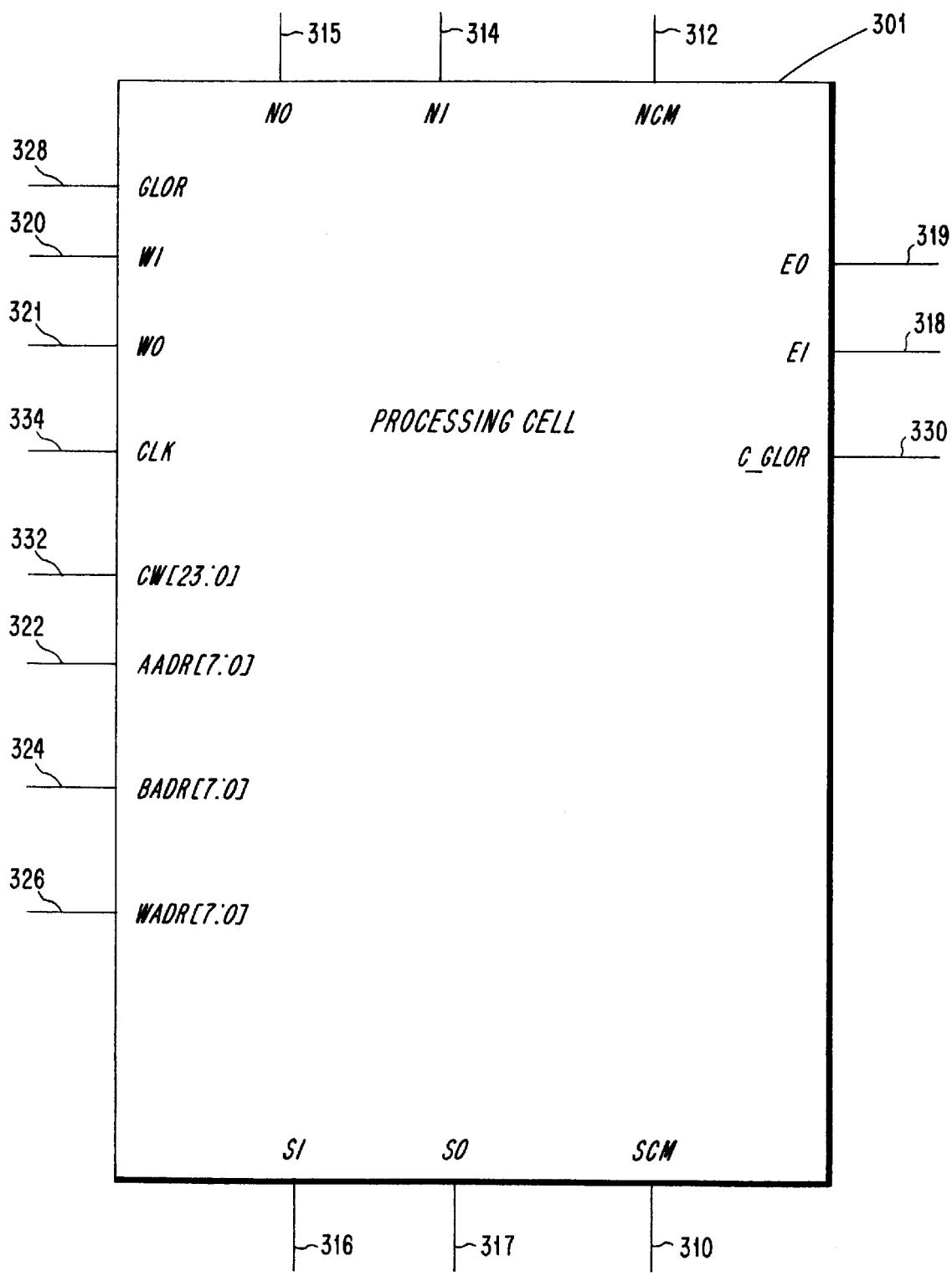
FIG. 3 shows a processing cell interface in accordance with the present invention.

The processing cell interface is shown in FIG. 3. For the purposes of this description tee top edge of the processing cell shall be designated as the north, the bottom edge as the south, the right edge as the east, and the left edge as the west.

Single bit input data is provided from the south by means of the South Communications input path (SCM) 310. Single bit output data is delivered to the north by means of the North Communications output path (NCM) 312. Single bit input data which are used as operands in arithmetic and logical operations are received from adjacent processing cells via the north, south, east, and west image paths (NI, SI, EI, WI) 314, 316, 318, 320. Single bit output data which are used as operands in arithmetic and logical operations are transmitted to adjacent processing cells via the north, south, east, and west output paths (NO, SO, EO, and WO) 315, 317, 319, 321. Within each processing cell 301, the outputs NO 315 and SO 317 are derived from a single source. The same is true for the signals EO 319 and WO 321. This is described in greater detail below.

The AADR[7:0] 322, BADR[7:0] 324, and WADR[7:0] 326 input address buses provide the addresses for data to be simultaneously read from and written to the cell's multi-port RAM 434.

The Cell GLobal-OR (C_GLOR) 330 signal is provided by each processing cell 301. From those signals, the chip GLOR hardware 601 generates the Global-OR (GLOR) signal which is provided to the GLOR input 328 to each processing cell 301. The chip GLOR hardware 601 is described in further detail below.

A clock signal is provided to each processing cell 301 by means of the CLK 334 input. This signal is derived from the CLK 212 that is applied to the SIMD component 110.

The CW[23:0] 332 input supplies the command word which controls the processing that the processing cell 301 shall perform during the following clock cycle.

A description of the CW[23:0] command bits follow.

Command Word

The primary function of the command word is to supply controlling signals for multiplexors in the processing cell 301 which route data between the ALU inputs, various registers, and the multi-port RAM 434, or between adjacent processing cells 301 via the communications or image buses. The command word also selects the single bit arithmetic and logical functions to be performed by the processing cell 301. In the preferred embodiment each field (i.e., group of bits) of the command word designates the command for a particular multiplexor or arithmetic/logical function within the processing cell 301.

The command word is partitioned into twelve groups of parallel logic functions that include:

| | | |
|---|---|---|
| 1) | CM_MUX | CM Register source data selection |
| 2) | NS_MUX | NS Register source data selection |
| 3) | EW_MUX | EW Register source data selection |
| 4) | C_MUX | C Register data selection |
| 5) | RAM_MUX/WE | RAM data selection and Write Enable |
| 6) | AL_MUX | AL Register source data selection |
| 7) | BL_MUX | BL Register source data selection |
| 8) | ACT_MUX | Cell activity operation selection |
| 9) | D_MUX | D Register source data selection |
| 10) | CO_CMD | ALU Carry/Borrow out operation selection |
| 11) | A_CMD | ALU A input operation selection |
| 12) | B_CMD | ALU B input operation selection |

These functions are controlled by specific groups of bits in the processing cell Command Word. These are defined as follows:

| | | |
|---|---|---|
| 1) | CM_MUX | CW [1:0] |
| 2) | NS_MUX | CW [4:2] |
| 3) | EW_MUX | CW [7:5] |
| 4) | C_MUX | CW [10:8] |
| 5) | RAM_MUX/WE | CW [13:11] |
| 6) | AL_MUX | CW [15:14] |
| 7) | BL_MUX | CW [17:161] |
| 8) | ACT_MUX | CW [19:18] |
| 9) | D_MUX | CW [20] |
| 10) | CO_CMD | CW [21] |
| 11) | A_CMD | CW [22] |
| 12) | B_CMD | CW [23] |

Figure 4A:
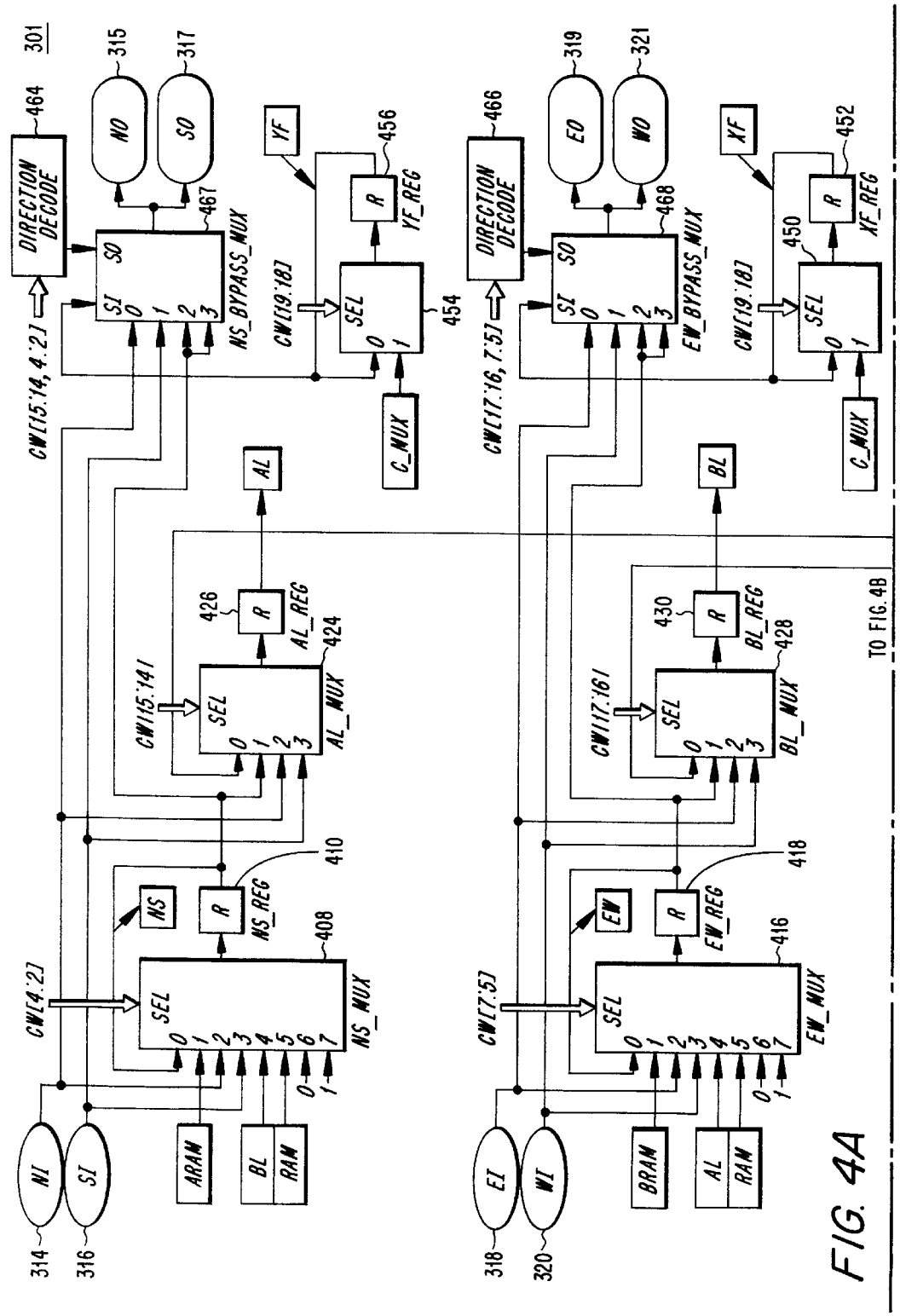
FIG. 4 is a block diagram of a processing cell in accordance with the present invention.
Figure 4B:
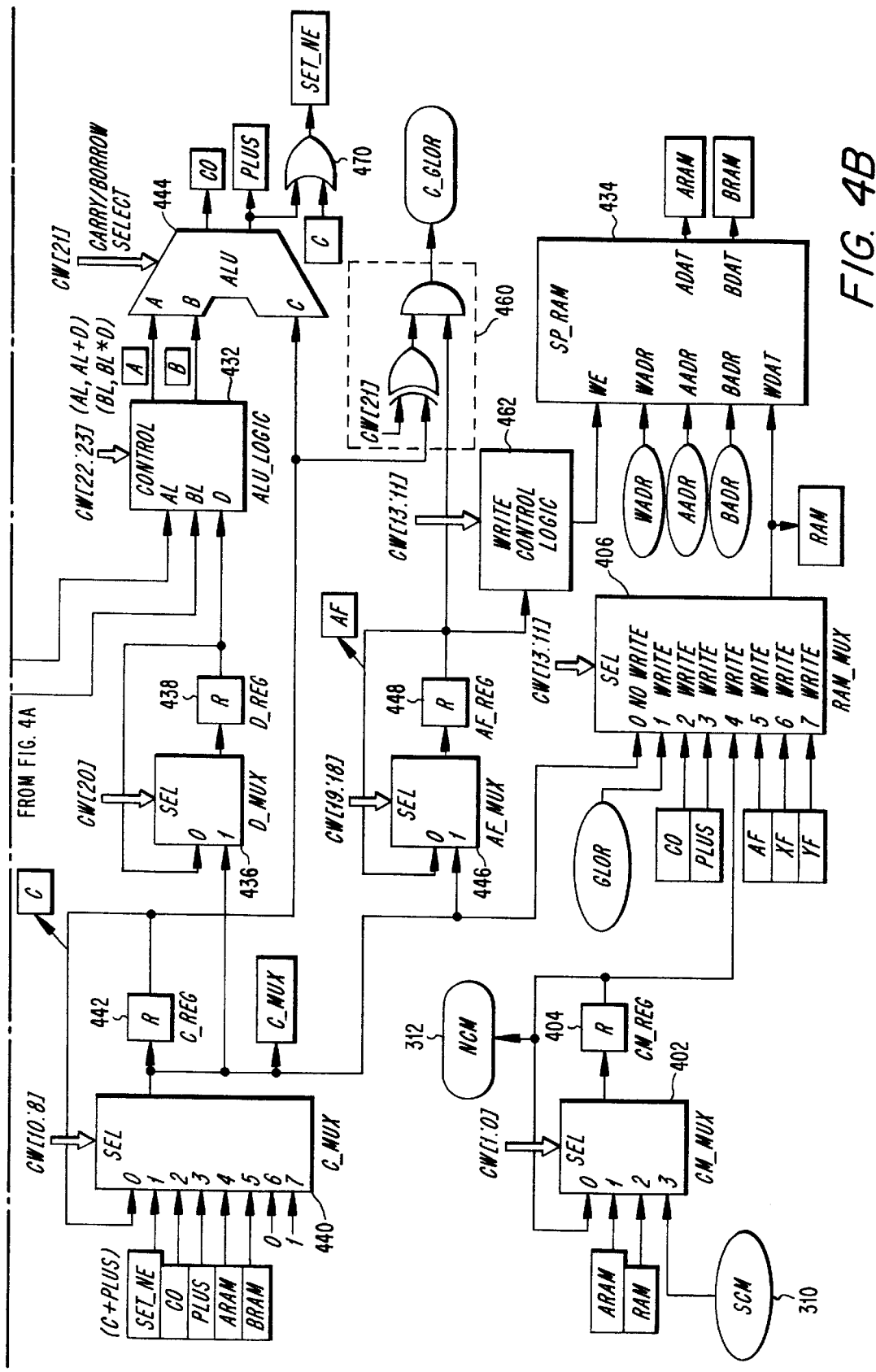
Figure 5B:
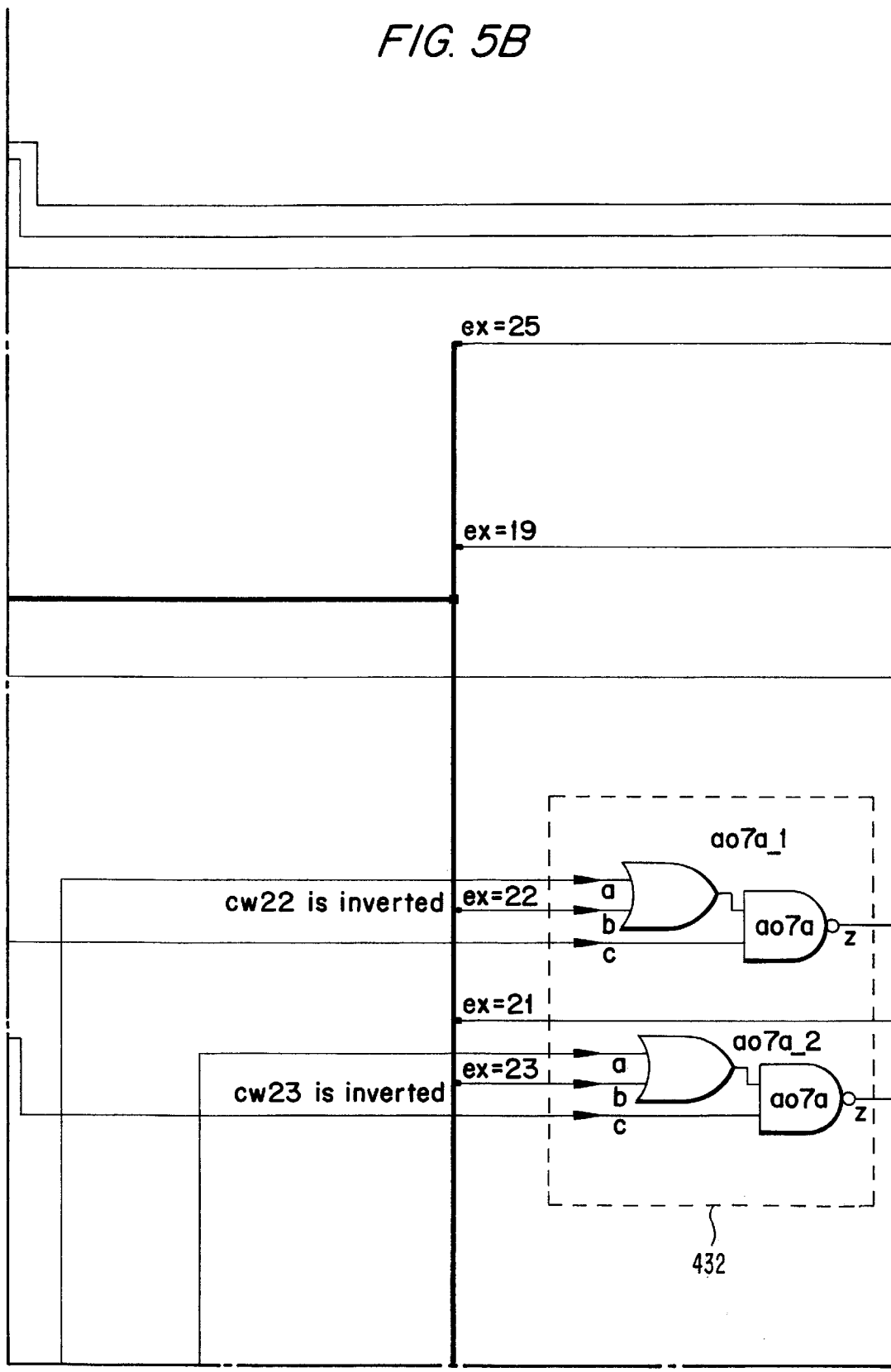
FIG. 5 shows a detailed implementation of the architecture in accordance with one embodiment of the present invention.
Figure 5C:
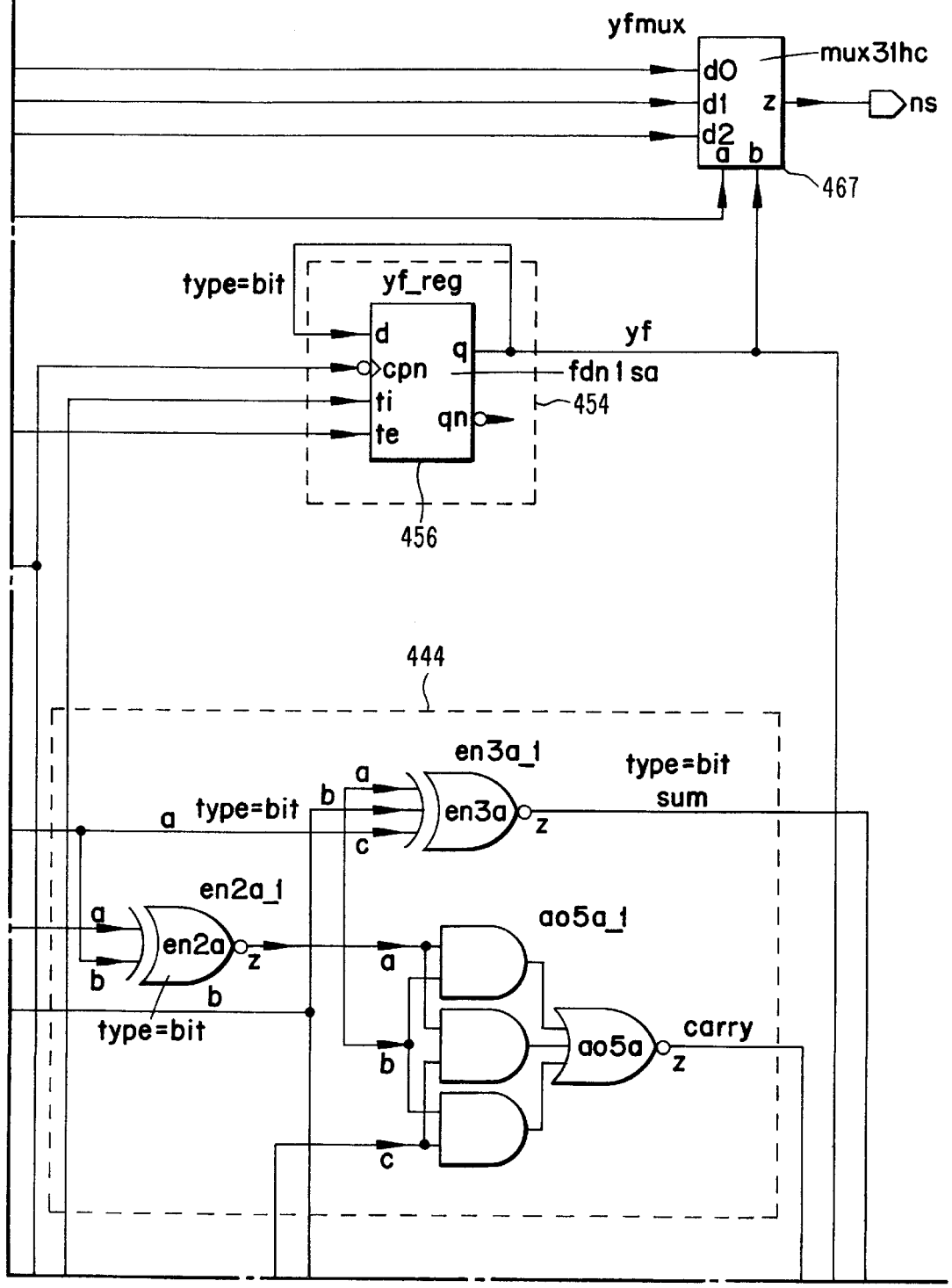
Figure 5D:
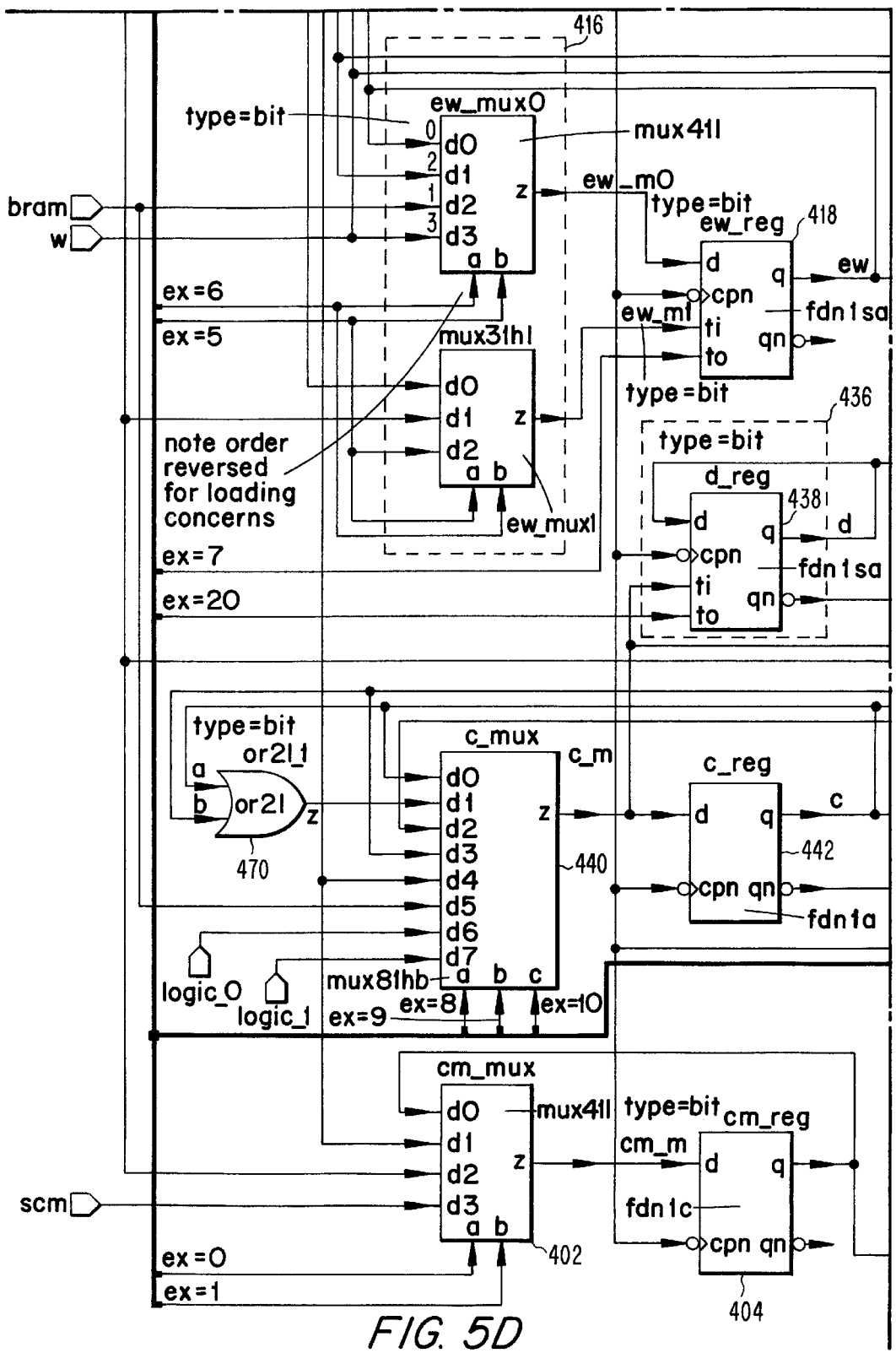
Figure 5E:
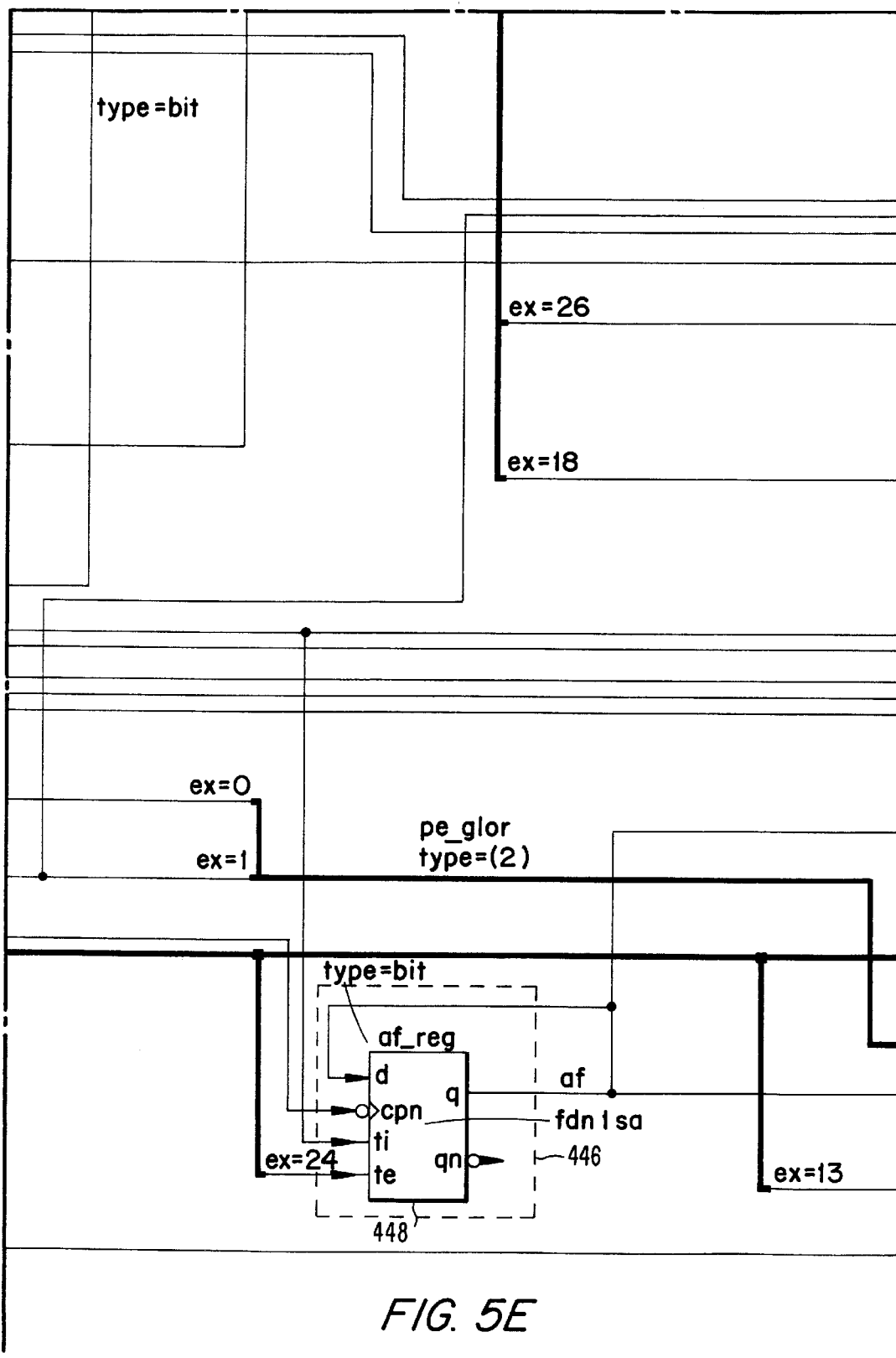
Figure 5F:
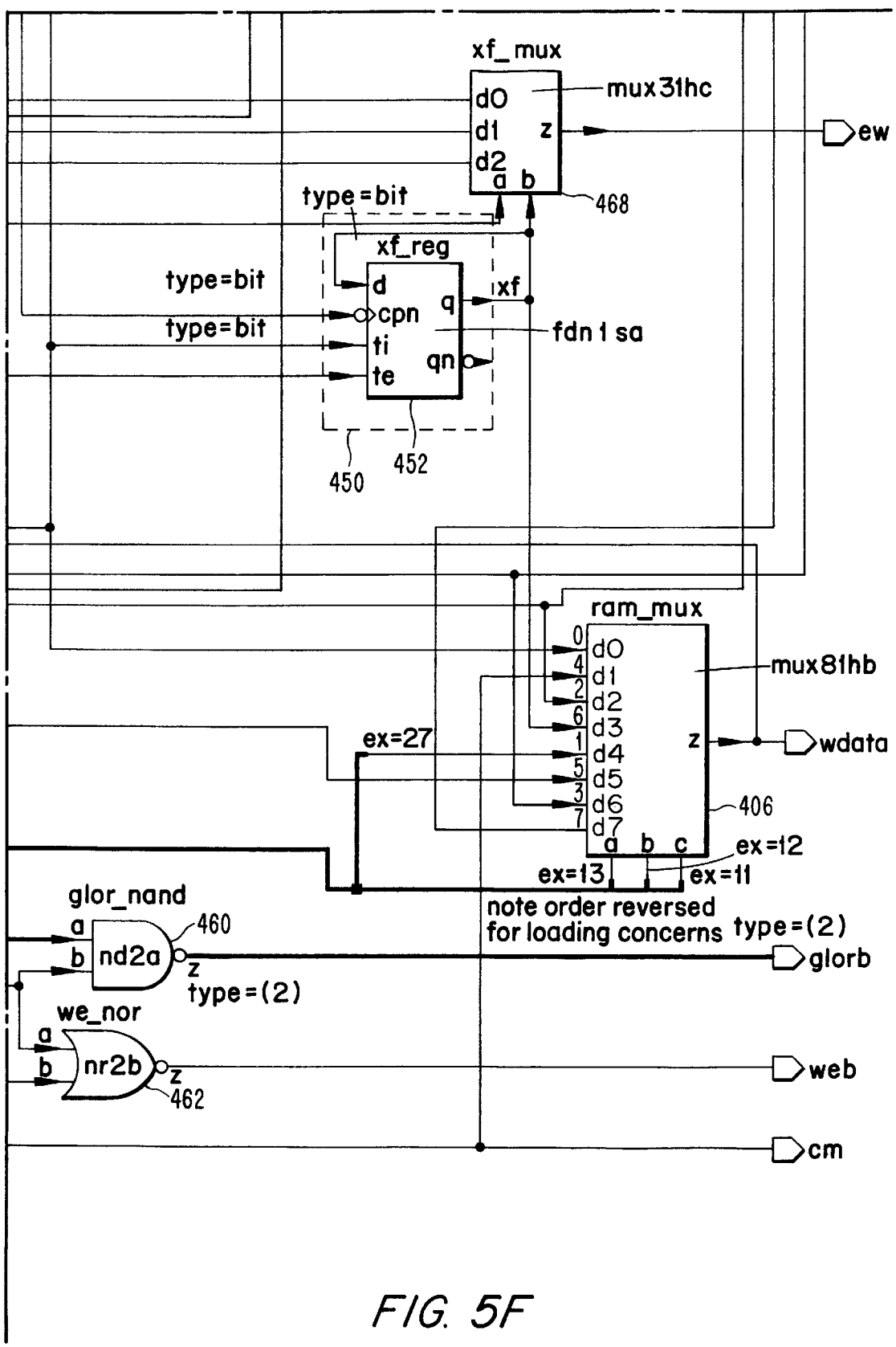

The identifiers of the multiplexors given in the above list reference the terminology found in FIGS. 4 and 5. The assignment of Command Word bit patterns to particular operations is shown in Table 1.

TABLE 1

| Function Group | Operations | Bit Assignment<br>23 22 21 20 19 18 17 16 15 14 13 12 11 10 9 8 7 6 5 4 3 2 1 0 |
|---|---|---|
| CM_MUX | CM: = CM | X X X X X X X X X X X X X X X X X X X X X X 0 0 |
| | CM: = ARAM | X X X X X X X X X X X X X X X X X X X X X X 0 1 |
| | CM: = RAM_MUX | X X X X X X X X X X X X X X X X X X X X X X 1 0 |
| | CM: = SCM | X X X X X X X X X X X X X X X X X X X X X X 1 1 |
| NS_MUX | NS: = NS | X X X X X X X X X X X X X X X X X X X 0 0 0 X X |
| | NS: = ARAM | X X X X X X X X X X X X X X X X X X X 0 0 1 X X |
| | NS: = NI | X X X X X X X X X X X X X X X X X X X 0 1 0 X X |
| | NS: = SI | X X X X X X X X X X X X X X X X X X X 0 1 1 X X |
| | NS: = BL | X X X X X X X X X X X X X X X X X X X 1 0 0 X X |
| | NS: = RAM_MUX | X X X X X X X X X X X X X X X X X X X 1 0 1 X X |
| | NS: = 0 | X X X X X X X X X X X X X X X X X X X 1 1 0 X X |
| | NS: = 1 | X X X X X X X X X X X X X X X X X X X 1 1 1 X X |
| EW_MUX | EW: = EW | X X X X X X X X X X X X X X X X 0 0 0 X X X X X |
| | EW: = BRAM | X X X X X X X X X X X X X X X X 0 0 1 X X X X X |
| | EW: = EI | X X X X X X X X X X X X X X X X 0 1 0 X X X X X |
| | EW: = WI | X X X X X X X X X X X X X X X X 0 1 1 X X X X X |
| | EW: = AL | X X X X X X X X X X X X X X X X 1 0 0 X X X X X |
| | EW: = RAM_MUX | X X X X X X X X X X X X X X X X 1 0 1 X X X X X |
| | EW: = 0 | X X X X X X X X X X X X X X X X 1 1 0 X X X X X |
| | EW: = 1 | X X X X X X X X X X X X X X X X 1 1 1 X X X X X |
| C_MUX | C: = C | X X X X X X X X X X X X X 0 0 0 X X X X X X X X |
| | C: = SET_NE | X X X X X X X X X X X X X 0 0 1 X X X X X X X X |
| | C: = CO | X X X X X X X X X X X X X 0 1 0 X X X X X X X X |
| | C: = PLUS | X X X X X X X X X X X X X 0 1 1 X X X X X X X X |
| | C: = ARAM | X X X X X X X X X X X X X 1 0 0 X X X X X X X X |
| | C: = BRAM | X X X X X X X X X X X X X 1 0 1 X X X X X X X X |
| | C: = 0 | X X X X X X X X X X X X X 1 1 0 X X X X X X X X |
| | C: = 1 | X X X X X X X X X X X X X 1 1 1 X X X X X X X X |
| RAM_MUX/WE | WRAM: = CMUX WE: = FALSE | X X X X X X X X X X 0 0 0 X X X X X X X X X X X |
| | WRAM: = GLOR WE: = AF | X X X X X X X X X X 0 0 1 X X X X X X X X X X X |
| | WRAM: = CO WE: = AF | X X X X X X X X X X 0 1 0 X X X X X X X X X X X |
| | WRAM: = PLUS WE: = AF | X X X X X X X X X X 0 1 1 X X X X X X X X X X X |
| | WRAM: = CM WE: = TRUE | X X X X X X X X X X 1 0 0 X X X X X X X X X X X |
| | WRAM: = AF WE: = TRUE | X X X X X X X X X X 1 0 1 X X X X X X X X X X X |
| | WRAM: = XF WE: = TRUE | X X X X X X X X X X 1 1 0 X X X X X X X X X X X |
| | WRAM: = YF WE: = TRUE | X X X X X X X X X X 1 1 1 X X X X X X X X X X X |
| AL_MUX | AL: = AL | X X X X X X X X 0 0 X X X X X X X X X X X X X X |
| | AL: = NS | X X X X X X X X 0 1 X X X X X X X X X X X X X X |
| | AL: = NI | X X X X X X X X 1 0 X X X X X X X X X X X X X X |
| | AL: = SI | X X X X X X X X 1 1 X X X X X X X X X X X X X X |
| BL_MUX | BL: = BL | X X X X X X 0 0 X X X X X X X X X X X X X X X X |
| | BL: = EW | X X X X X X 0 1 X X X X X X X X X X X X X X X X |
| | BL: = EI | X X X X X X 1 0 X X X X X X X X X X X X X X X X |
| | BL: = WI | X X X X X X 1 1 X X X X X X X X X X X X X X X X |
| ACT_MUX | NO_OP | X X X X 0 0 X X X X X X X X X X X X X X X X X X |
| | AF: = CMUX | X X X X 0 1 X X X X X X X X X X X X X X X X X X |
| | XF: = CMUX | X X X X 1 0 X X X X X X X X X X X X X X X X X X |
| | YF: = CMUX | X X X X 1 1 X X X X X X X X X X X X X X X X X X |
| D_MUX | D: = D | X X X 0 X X X X X X X X X X X X X X X X X X X X |
| | D: = CMUX | X X X 1 X X X X X X X X X X X X X X X X X X X X |
| CO_CMD | CO: = CARRY | X X 0 X X X X X X X X X X X X X X X X X X X X X |
| | CO: = BORROW | X X 1 X X X X X X X X X X X X X X X X X X X X X |
| A_CMD | A: = AL | X 0 X X X X X X X X X X X X X X X X X X X X X X |
| | A: = AL + D | X 1 X X X X X X X X X X X X X X X X X X X X X X |
| B_CMD | B: = BL | 0 X X X X X X X X X X X X X X X X X X X X X X X |
| | B: = BL & D | 1 X X X X X X X X X X X X X X X X X X X X X X X |

The hardware within each processing cell 301 will now be described with reference to FIGS. 4 and 5. FIG. 4 depicts a block diagram of a processing cell 301. FIG. 5 shows a preferred circuit implementation of the hardware represented by blocks in FIG. 4.

Communications Multiplexor and Register.

The Communications Multiplexor (CM_Mux) 402 and register (CM_Reg) 404 connect each processing cell 301 with its north and south neighbor to allow data to be shifted into and out of the array. Data movement is from south to north, and may be performed concurrently with processing cell computations.

The CM_Mux 402 selects a value, from those presented at its inputs, to store into the CM_Reg 404 on the basis of the value of CW[1:0] as described in Table 1. One of the inputs to the CM_MUX 402 is connected to the output of the CM_Reg 404 in order to preserve a value in the CM_Reg 404 over multiple clock cycles. The remaining three inputs of the CM_MUX 402 are connected, respectively, to the ARAM output of the multiport RAM 434, the output of the RAM_MUX 406, and the SCM 310 input. Because the RAM_MUX 406 output is one of the inputs to the CM_MUX 402, those signals which are inputs to the RAM_MUX 406 are also made available to the CM_MUX 402. This feature enhances the ability to export particular signals out of the processing cell 301 for test purposes.

The output of the CM_Reg 404 is connected to the input of the CM_MUX 402, the RAM_MUX 406, and to the NCM 312 output of the cell, which is connected to the SCM 310 input of a northern adjacent processing cell 301.

NS Multiplexor, NS Register, and NS Bypass Multiplexor

The NS MUltipleXor (NS_MUX) 408, NS register (NS_Reg) 410, and NS Bypass Mutliplexor (NS_Bypass_MUX) 467 are used to transfer operand data from one processing cell 301 to another along the north and south directions, as well as to supply, operands for processing in the Arithmetic Logic Unit (ALU) 444. The North Output (NO) 315 and North Input (NI) 314 are the signal paths for data transfers to/from the North neighbor while the South Output (SO) 317 and South Input (SI) 316 are the signal paths for data transfers to/from the South neighbor.

The NS_MUX 408 selects data, from those presented at its eight inputs, for storing to the NS_Reg 410. This selection is controlled by the three command signals (CW[4:2]) as shown in Table 1. The eight inputs of the NS_MUX 408 are connected, respectively, to the output of the NS_Reg 410, the ARAM output of the multiport RAM 434, the NI input 314, the SI input 316, the output of the BL_Reg 430, the output of the RAM_MUX 406, an immediate 0 data value, and an immediate 1 data value.

The output of the NS_MUX 408 is connected to the input of the NS_Reg 410, allowing the following operations to be defined (where "NS" represents the NS_Reg 410):

| 1) | NS: = NS | Hold current value |
|---|---|---|
| 2) | NS: = ARAM | Load NS_Reg 410 from ARAM output of multiport RAM 434 |
| 3) | NS: = NI | Load NS_Reg 410 from NI input 314 |
| 4) | NS: = SI | Load NS from SI input 316 |
| 5) | NS: = BL | Load NS_Reg 410 from output of BL_Reg 430 |
| 6) | NS: = RAM | Load NS_Reg 410 from output of RAM_MUX 406 |
| 7) | NS: = 0 | Load NS_Reg 410 with immediate 0 value |
| 8) | NS: = 1 | Load NS_Reg 410 with immediate 1 value |

As stated above, the output of the NS_Reg 410 is connected to one of inputs of the NS_MUX 408. The output of the NS_Reg 410 is also connected to the inputs of the NS_Bypass_MUX 467, and the AL multiplexor (AL_MUX) 424.

The NS_BYPASS_MUX 467 has two other inputs, which are connected, respectively, to the NI input 314 and the SI input 316. The output of the NS_Bypass-MUX 467 is connected to the NO output 315 and the SO output 317. With this arrangement, the processing cell 301 can contribute an internally generated data value, stored in the NS_Reg 410, to the NO and SO outputs 315, 317, or else the processing cell 301 can be bypassed by contributing instead, the value that it receives from its north or south neighboring cell on, respectively, the NI input 314 or the SI input 316. The NS_BYPASS_MUX 467 is controlled by the output of the YF_Reg 456 and the NS direction decode logic 464. The bypass feature is not duplicated for the output of the CM_Reg 404 because the user may wish to shift data into every row while concurrently performing an algorithm which requires that information be transferred to non-neighbor cells during its execution. For fault tolerant systems utilizing this bypass feature, the controller must provide the means for shifting in "useless" data for the failed or bypassed row to guarantee that the non-bypassed cells contain proper data (i.e., data which provides a contiguous image).

EW Mutliplexor, EW Register, and EW Bypass Multiplexor

The EW Multiplexor (EW_MUX) 416, EW Register (EW_Reg) 418, and EW Bypass Multiplexor (EW_Bypass_MUX) 468 are used to transfer operand data from one processing cell 301 to another along the east and west directions, as well as to supply operands for processing in the Arithmetic Logic Unit (ALU) 444. The East Output (EO) 319 and East Input (EI) 318 are the signal paths for data transfers to/from the East neighbor while the West Output (WO) 321 and West Input (WI) 320 are the signal paths for data transfers to/from the West neighbor.

The EW_MUX 416 selects data, from those presented at its eight inputs, for storing to the EW_Reg 418. This selection is controlled by the three command signals (CW[7:5]) as shown in Table 1. The eight inputs of the EW_MUX 416 are connected, respectively, to the output of the EW_Reg 418, the BRAM output of the multiport RAM 434, the EI input 318, the WI input 320, the output of the AL_Reg 426, the output of the RAM_MUX 406, an immediate 0 data value, and an immediate 1 data value.

The output of the EW_MUX 416 is connected to the input of the EW_Reg 418, allowing the following operations to be defined (where "EW" represents the EW_Reg 418):

| 1) | EW: = EW | Hold current value |
|---|---|---|
| 2) | EW: = BRAM | Load EW_Reg 418 from BRAM output of multiport RAM 434 |
| 3) | EW: = EI | Load EW_Reg 418 from EI input 318 |
| 4) | EW: = WI | Load EW_Reg 418 from WI input 320 |
| 5) | EW: = AL | Load EW_Reg 418 from output of AL_Reg 426 |
| 6) | EW: = RAM | Load EW_Reg 418 from output of RAM_MUX 406 |
| 7) | EW: = 0 | Load EW_Reg 418 with immediate 0 value |
| 8) | EW: = 1 | Load EW_Reg 418 with immediate 1 value |

As stated above, the output of the EW_Reg 418 is connected to one of the inputs of the EW_MUX 416. The output of the EW_Reg 418 is also connected to the inputs of the EW_Bypass_MUX 468 and the BL Multiplexor (BL_MUX) 428.

The EW_Bypass_MUX 468 has two other inputs, which are connected to the EI input 318 and the WI input 320. The output of the EW_Bypass_MUX 468 is connected to the EO output 319 and the WO output 321. With this arrangement, the processing cell 301 can contribute an internally generated data value, stored in the EW_Reg 418, to either the EO output 319 or the WO output 321, or else the processing cell 301 can be bypassed by contributing, instead, the value that it receives from its east or west neighboring cell on, respectively, the EI input 318 or the WI input 320. The output of the EW_BYPASS_MUX 468 is controlled by the output of the XF_Reg 452 and the EW direction decode logic 466.

AL Multiplexor and AL Register

The AL multiplexor (AL_MUX) 424 and AL register (AL_Reg) 426 are used by one processing cell 301 to receive data from another processing cell 301 along the North and South directions. The received data is supplied as an operand to the processing cell ALU_Logic 432 as shown in FIGS. 4 and 5.

The AL_MUX 424 has four inputs which are connected, respectively, to the output of the AL_Reg 426, the output of the NS_Reg 410, the NI input 314, and the SI input 316. The AL_MUX 424 is controlled by the CW[15:14] command field as shown in Table 1.

The output of the AL_MUX 424 is connected to the input of the AL_Reg 426 allowing the following operations to be defined (where "AL" represents the AL_Reg 426):

| | | |
|---|---|---|
| 1) | AL: = AL | Hold current value |
| 2) | AL: = NS | Load AL_Reg 426 from output of NS_Reg 410 |
| 3) | AL: = NI | Load AL_Reg 426 from NI input 314 |
| 4) | AL: = SI | Load AL_Reg 426 from SI input 316 |

BL Multiplexor and BL Register

The BL multiplexor (BL_MUX) 428 and BL register (BL_Reg) 430 are used by one processing cell 301 to receive data from another processing cell 301 along the East and West directions. The received data is supplied as an operand to the processing cell ALU_Logic 432 as shown in FIG. 4 and FIG. 5.

The BL_1MUX 428 has four inputs which are connected, respectively, to the output of the BL_Reg 430, the output of the EW_Reg 418, the EI input 318, and the WI input 320. The BL_MUX 428 is controlled by the CW[17:16] command field as shown in Table 1.

The output of the BL_MUX 428 is connected to the input of the BL_Reg 430 allowing the following operations to be defined (where "BL" represents the BL_Reg 430):

| | | |
|---|---|---|
| 1) | BL: = BL | Hold current value |
| 2) | BL: = EW | Load BL_Reg 430 from output EW_Reg 418 |
| 3) | BL: = EI | Load BL_Reg 430 from EI 318 |
| 4) | BL: = WI | Load BL_Reg 430 from WI 320 |

The AL_Reg 426 and BL_Reg 430, in conjunction with the NS_Reg 410 and the EW_Reg 418, make it possible to simultaneously read data from the multiport RAM 434 and shift data between processing cells 301 over the North/South and East/West image buses. This is possible because the NS_Reg 410 and EW_Reg 418 may load data from the multiport RAM 434 while the AL_Reg 426 and BL_Reg 430 read image bus data supplied by neighboring cells. This data flow pipelining produces an execution speed improvement of one clock cycle per operand bit for operations which involve shifting of operand data between cells. This improvement is significant, especially for operations of small radius (i.e., for operations between an operand located in one processing cell 301 and another operand that is located in a closely neighboring processing cell 301). For example, this improvement nearly doubles the execution speed of a radius one operation.

Should conflicting instructions be supplied which command the NS_Reg 410 and AL_Reg 426 to shift in opposite directions, then the NS command takes precedence by overriding the AL command for bidirectional control.

Similarly, should conflicting instructions be supplied which command the EW_Reg 418 and the BL_Reg 430 to shift in opposite directions, the EW command takes precedence by overriding the BL command for bidirectional control.

Shifting operations are simultaneously performed for each processing cell 301 in the parallel processor array 101. Data is moved along the image buses at a rate of one shift per clock.

D Multiplexor and D Register

The D multiplexor (D_MUX) 436 and D register (D_Reg) 438 supply a mask value for the A and B inputs of the Arithmetic Logic Unit (ALU) (reference FIGS. 4 and 5) in support of primitives which require mask operations, as explained below.

The D_MUX 436 has two inputs which are connected, respectively, to the output of the D_Reg 438, and the output of the C_MUX 440. Selection by the D_MUX 436 is controlled by the command word field CW[20].

The output of the D_MUX 436 is connected to the input of the D_Reg 438, allowing the following operations to be defined (where "D" represents the D_Reg):

| | | |
|---|---|---|
| 1) | D: = D | Hold current value |
| 2) | D: = C_MUX | Load D_Reg 438 from output of C_MUX 440 |

A and B Mask Logic

The mask logic for the Arithmetic Logic Unit (ALU_Logic) 432 has A and B outputs which are connected, respectively, to the A and B inputs of the Arithmetic Logic Unit (ALU) 444. The purpose of the ALU_Logic 432 is to allow the A and B inputs of the ALU 444 to be masked by the value contained in the D_Reg 438.

To accomplish this, the ALU_Logic 432 has three inputs which are connected, respectively, to the output of the AL_Reg 426, the output of the BL_Reg 430 and the output of the D_Reg 438.

The mask operations are controlled by the A_CMD and B_CMD command word fields. When the A_CMD (CW[22]) field is 0, the ALU_Logic 432 selects the output of the AL_Reg 426 as the A input of the ALU 444. When the A_CMD field is 1, the AlU_Logic 432 selects the output of the AL_Reg 426 ORed with the output of the D_Reg 438 as the A input of the ALU 444.

Similarly, the output of the BL_Reg 430 is selected as the B input of the ALU 444 when the B_CMD field (CW[23]) is 0. The output of the BL_Reg 430 ANDed with the output of the D_Reg 438 is selected as the B input of the ALU 444 when the B_CMD field is set to 1.

C Multiplexor and C Register

The C Multiplexor (C_MUX) 440 and the C register (C_Reg) 442 are shown in FIGS. 4 and 5.

The C_MUX 440 has eight inputs which are connected respectively to the output of the C_Reg 442, the output of the set if not equal logic (SET_NE) 470, the CO output of the ALU 444, the PLUS output of the ALU 444, the ARAM output of the multiport RAM 434, the BRAM output of the multiport RAM 434, an immediate 0 value, and an immediate 1 value. Selection by the C_MUX 440 is controlled by the command field CW[10:8].

The output of the C_MUX 440 is connected to the input of the C_Reg 442. This allows the following operations to be performed (where "C" represents the C_Reg 442):

| | | |
|---|---|---|
| 1) | C: = C | Hold current value |
| 2) | C: = SET_NE | Load C_Reg 442 from SET_NE logic 470 |
| 3) | C: = CO | Load C_Reg 442 from CO output from ALU 444 |
| 4) | C: = PLUS | Load C_Reg 442 from PLUS output from ALU 444 |
| 5) | C: = ARAM | Load C_Reg 442 from ARAM output from multiport RAM 434 |
| 6) | C: = BRAM | Load C_Reg 442 from BRAM output of multiport RAM 434 |
| 7) | C: = 0 | Load C_Reg 442 with immediate 0 value |
| 8) | C: = 1 | Load C_Reg 442 with immediate 1 value |

As stated above, the output of the C_MUX 440 is connected to the input of the C_Reg 442. In addition, the output of the C_MUX 440 may be clocked into the D_Reg 438, the AF_Reg 448, the XF_Reg 452, and the YF_Reg 456 through their respective D_MUX 436, AF_MUX 446, XF_MUX 450, and YF_MUX 454. The output of the C_MUX 440 is also connected to an input of the RAM_MUX 406, so that it is also available at all of the inputs that are connected to the output of the RAM_MUX 406. However, the output of the C_MUX 440 may not actually be written into the multiport RAM 434.

The C_Reg 442 supplies the carry (or borrow) input to the ALU 444 for ADD (or SUB) operations.

ALU Logic

The Arithmetic Logic Unit (ALU) 444 in combination with the ALU_Logic 432 provides support for logical and arithmetic operations. The ALU 444 has three inputs labeled A, B and C. The ALU 444 also has two outputs labeled CO (carry output) and PLUS. The PLUS output represents the logical exclusive OR of the three inputs A, B, and C, and may be used to represent the single bit sum or difference of the three inputs. The command input CW[21] determines whether the CO output is to be a Carry (CW[21]=0) or a Borrow (CW[21]=1). Single bit operands are supplied to the ALU 444 on the A and B inputs while the C input is the CARRY (or BORROW) input. The CO output is the CARRY out of A+B+C when CW[21] is 0 and the BORROW out of A−B−C when CW[21] is 1.

The primitives are supported by a combination of single bit ALU operations (see section below entitled "Primitives"). The single bit ALU operations are controlled by the command field CW[23:21]. The command field CW[23:22] determines whether the A and B operands are to be gated with the output of the D_Reg 438 as described above with respect to the ALU_Logic 432. As previously stated, command field CW[21] determines whether the CO output represents a carry or borrow. Table 2 describes the single bit ALU operations that are supported for the various possible inputs to the ALU logic.

TABLE 2

| CW | | | ALU | | | |
|---|---|---|---|---|---|---|
| 23 | 22 | 21 | INPUTS | | | Primitives Supported |
| 0 | 0 | 0 | AL | BL | CARRY | ADD, XOR, AND, OR |
| 0 | 0 | 1 | AL | BL | BORROW | SUB, COMPARE, AND, OR |
| 0 | 1 | 0 | AL | BL & D | CARRY | ADDIF, ABS |
| 0 | 1 | 1 | AL | BL & D | BORROW | SUBIF, ABS |
| 1 | 0 | 0 | AL + D | BL | CARRY | IFADD |
| 1 | 0 | 1 | AL + D | BL | BORROW | |
| 1 | 1 | 0 | AL + D | BL & D | CARRY | FORK |
| 1 | 1 | 1 | AL + D | BL & D | BORROW | FORK |

Activity Command Logic

The activity command field in the command word (CW[19:18]) controls the loading of three registers: the activity flag register (AF_Reg) 448, the XF register (XF_Reg) 452, and the YF register (YF_Reg) 456 register. Table 3 shows how the activity command field setting affects each of these registers.

TABLE 3

| CW | | AF_REG | XF_REG | YF_REG |
|---|---|---|---|---|
| 19 | 18 | | | |
| 0 | 0 | AF: = AF | XF: = XF | YF: = YF |
| 0 | 1 | AF: = C_MUX | XF: = XF | YF: = YF |
| 1 | 0 | AF: = AF | XF: = C_MUX | YF: = YF |
| 1 | 1 | AF: = AF | XF: = XF | YF: = C_MUX |

The Activity Flag register (AF_Reg) 448 is used to enable (AF=1) or disable (AF=O) the Cell GLOR (C_GLOR) output of the global OR logic (GLOR_Logic) 460, and the writing of data to multiport RAM 434. The input of the AF_Reg 448 is connected to the output of the AF MUltipleXor (AF_MUX) 446. The AF_MUX 446 has two inputs which are connected respectively to the output of the AF_Reg 448, and the output of the C_MUX 440. As shown in Table 3, this allows the AF_Reg 448 to either hold its own value or receive a new value from the output of the C_MUX 440.

The output of the XF Register (XF_Reg) 452 is connected to one of the control inputs of the EW_Bypass_MUX 468. Consequently, the output of the XF_Reg controls whether the processing cell 301 will be bypassed (XF=0) or not (XF=1) during cell to cell shift operations in the east-west direction. For a cell which is not bypassed, the EW_Bypass_MUX 468 supplies the EW_Reg 418 value for both EO 319 and WO 321. For a cell which is bypassed, the EW_Bypass_MUX 468 supplies the EI 318 signal for EO 319 and WO 321 if the direction decode 466 indicates a shift from the east, but supplies the WI 320 signal for EO 319 and NO 421 if the direction decode 466 indicates a shift from the west.

The input of the XF_Reg 452 is connected to the output of the XF Multiplexor (XF_MUX) 450. The XF_MUX 450 has two inputs which are connected respectively to the output of the XF_Reg 452 and the output of the C_MUX 440. This enables the XF_Reg to either hold its value or load a new one through the C_MUX 440.

The output of the YF Register (YF_Reg) 456 is connected to one of the control inputs of the NS_Bypass_MUX 467. Consequently, the output of the YF_Reg 456 controls whether the processing cell 301 will be bypassed (YF=0) or not (YF=1) during cell to cell shift operations that occur in the north-south direction along the NS image bus. For a cell which is not bypassed, the NS_Bypass_MUX 467 supplies the NS_Reg 410 value for both NO 315 and SO 317. For a cell which is bypassed, the NS_Bypass_MUX 467 supplies the NI 314 signal for NO 315 and SO 317 if the direction decode 464 indicates a shift from the north, but supplies the SI 316 signal for NO 315 and SO 317 if the direction decode 464 indicates a shift from the south.

The input of the YF_Reg 456 is connected to the output of the YF Multiplexor (YF_MUX) 454. The YF_MUX 454 has two inputs that are connected, respectively, to the output of the YF_Reg 456 and the output of the C_MUX 440. This enables the YF_Reg 456 to either hold its value or load a new one through the C_MUX 440.

The contents of the XF_Reg 452, YF_Reg 456 and the AF_Reg 448 may each be stored in the multiport RAM 434.

Cell GLOR Logic and Output.

The cell GLobal OR (GLOR) logic 460 controls the propagation of the value (C) stored in the C_Reg 442 to the input of the chip GLOR logic 601 described below. The output of the AF_Reg 448 is input to the GLOR logic 460 for the purpose of either enabling (AF=1) or disabling (AF=0) this propagation. The command field CW[21] is input to the GLOR logic 460 for the purpose of selecting whether C is sent unchanged to the chip GLOR logic 601 (CW[21]=0), or whether it is inverted to make the chip GLOR 601 represent a Global NAND (CW[21]=1).

The following is the logic equation for the cell GLOR (C_GLOR) function:

$$C\_GLOR = AF\ \&\ (C\ XOR\ CW[21])$$

The chip GLOR logic 601 is described more fully below.

RAM Write Select Logic

The RAM write select logic is made up of the RAM multiplexor (RAM_MUX) 406 and the write control logic (Write_Ctrl) 462. This logic is controlled by CW[13:11], as shown in Table 1.

The RAM_MUX 406 has eight inputs which are connected, respectively, to the C_MUX 440, the output 328 from the chip GLOR logic 601 which is input to this processing cell 301, the CO output from the ALU 444, the PLUS output from the ALU 444, the output from the CM_Reg 404, the output from the AF_Reg 448, the output from the XF_Reg 452, and the output from the YF_Reg 456. One of these inputs is selected to appear at the output of the RAM_MUX 406 on the basis of the value of the command field CW[13:11]. The output of the RAM_MUX 406 is connected to the write data input of the multiport RAM 434, an input of the CM_MUX 402, an input of the NS_MUX 408, and an input of the EW_MUX 416.

The WRAM:=GLOR operation provides the capability to propagate information between a single processing cell 301 and as many of the others as is desired within a given array of processing cells located in a single SIMD component 110. This is done by setting all AF_Reg 448 outputs to zero except the one that is to drive the internal array, and then propagating that value to other cells in the SIMD component 110 by having them select the chip GLOR on the RAM_MUX 406. The GLOR value is delayed one clock cycle from the inputs determining it.

The address to which data is written appears at the Write ADdRess (WADR) input of the multi port RAM 434. Whether the multiport RAM 434 actually stores the value that appears at its Write DATA (WDAT) input is controlled by the Write ConTRol Logic (Write_CTRL) 462. Depending on the value of the command field CW[13:11], either no write will be performed (CW[13:11=000), a write operation will be performed only if the value stored in the AF_Reg 448 is equal to one (CW[13:11]=001, 010, 011) or else a write will unconditionally be performed (CW[13:11]=100, 101, 110, 111). This may be expressed by the following formula, where "WE" represents a "Write Enable" signal:

WE=CW[13]+((CW[12]+CW[11]) & AF)

Note that when no write operation is taking place (CW [13:11]=000), the output value of the C_MUX 440 appears at the output of the RAM_MUX 406. This allows the C_MUX 440 value to be propagated to other gates within the processing cell 301 without writing this value to the multiport RAM 434. It should also be noted that the command field CW[13:11] controls both the RAM_MUX 406 and the write control logic 462. As a result, the C_MUX 440 is never written to the multiport RAM 434; the outputs from the chip GLOR Logic 601, CO output from the ALU 444, and the PLUS output from the ALU 444 can only be written to the multiport RAM 434 if the value stored in the AF_Reg 448 is equal to one; and the values that are output from the CM_Reg 404, AF_Reg 448, XF_Reg 452, and YF_Reg 456 may only be written to the multiport RAM 434 unconditionally.

Processing Cell RAM

Each processing cell 301 includes a multiport RAM. In the preferred embodiment, this, is a 192 bit triple port static RAM 434 organized as 192×1 bit. Note that only one unique address per storage element exists. The multiport RAM 434 supports two reads and one write per clock cycle to allow pipelined operation of the ALU 444. With this feature, subsequent operands can be loaded into processing cell registers while the current result is being stored into the multiport RAM 434. Without this capability, the processing cell ALU operations would take 2 to 3 times longer.

A simultaneous read and write to the same address is prohibited. Three separate addresses are given for each of the 3 ports (1 write and 2 read). The write address port is denoted by WRAM and the read address ports by ARAM and BRAM.

The read logic of the multiport RAM 434 allows for the simultaneous access of any two locations in a single clock cycle. Addresses AADR[7:0] and BADR[7:0] are provided to respective AADR and BADR inputs of multiport RAM 434, and the single bit data comes out on the ARAM and BRAM lines respectively. Simultaneous reads of the same address by ARAM and BRAM are permitted. The access time of the multiport RAM 434 is such that the read data, generated from the rising clock edge that changes the RAM addresses, reaches all destination registers in the processing cell 301 with sufficient setup time before the next rising clock edge. The data should remain at the these registers long enough to meet the register's flip flop hold times.

The Write_Ctl 462 logic allows for a single write access to occur on each clock cycle to any location in the multiport RAM 434 as defined by the WADR [7:0] address. The multiport RAM 434 need not be capable of performing a simultaneous read and write to the same location.

Internal Array

Referring now to FIG. 6, a block diagram of a SIMD component 110 is shown. Each SIMD component 110 contains an interconnected network of 192 identical processing cells 301 as shown in FIG. 6. The cells along the outer edge of the internal array are defined as I/O cells.

Internal Image Buses

The NS bus 630 and EW bus 632 are, respectively, the North/South and East/West Image buses that provide bidirectional data paths for transferring image data in two dimensions between processing cells 301 as required to implement the various arithmetic and logical operations. Data transfers between processing cells 301 take place on each image bus at the rate of one bit per clock cycle.

The internal image buses consist of four sets of unidirectional signal pairs for each processing cell 301 and are defined as follows:

1) NO 315/NI 314—North Output/North Input
2) SO 317/SI 316—South Output/South Input
3) EO 319/EI 318—East Output/East Input
4) WO 321/WI 320—West Output/West Input The image bus signals into and out of the I/O cells feed into the I/O circuitry 620 described below to allow data movement between cells on the edges of adjacent SIMD components 110.

Internal Communication Buses

The internal Communication Bus (CM) 640 provides a data path for inputting and outputting external data to and from the processing cells 301. The internal CM bus 640 shifts data from south to north in the array. Shift operations on the internal CM bus 640 are independent of operations that take place on the image buses and those that are related to ALU functions. This allows inputting and/or outputting an image into processing cells 301 while simultaneously processing other images in the same processing cells 301.

The internal CM bus 640 consists of two unidirectional signals for each cell which are defined as follows:

1) NCM 312—North Communications Output
2) SCM 310—South Communications Input

In the SIMD component 110, the NCM 312 signal of each internal processing cell 301 connects to the SCM 310 signal of a north adjacent processing cell 301 in order to allow image loading of the array through the southern most part. The NCM 312 signals of processing cells 301 in the northern-most row are combined to produce the intercomponent North Communications Bus 960, as described below with reference to FIG. 9. Similarly, the SCM 310 signals of processing cells 301 in the southern-most row are combined to produce the inter-component South Communication ]Bus 962, as described below with reference to FIG. 9.

Chip GLOR Hardware

The chip GLobal OR (GLOR) 601 function and hardware will now be described with reference to FIG. 7.

The following equation describes the chip GLOR functions:

GLOR:=C_GLOR(0)+C_GLOR(1)+ . . . +C_GLOR(191)

where "+" represents a logical OR operation, and C_GLOR (i) represents the output of the GLOR_Logic 460 in processing cell i, where i is a non-negative integer.

Figure 7:
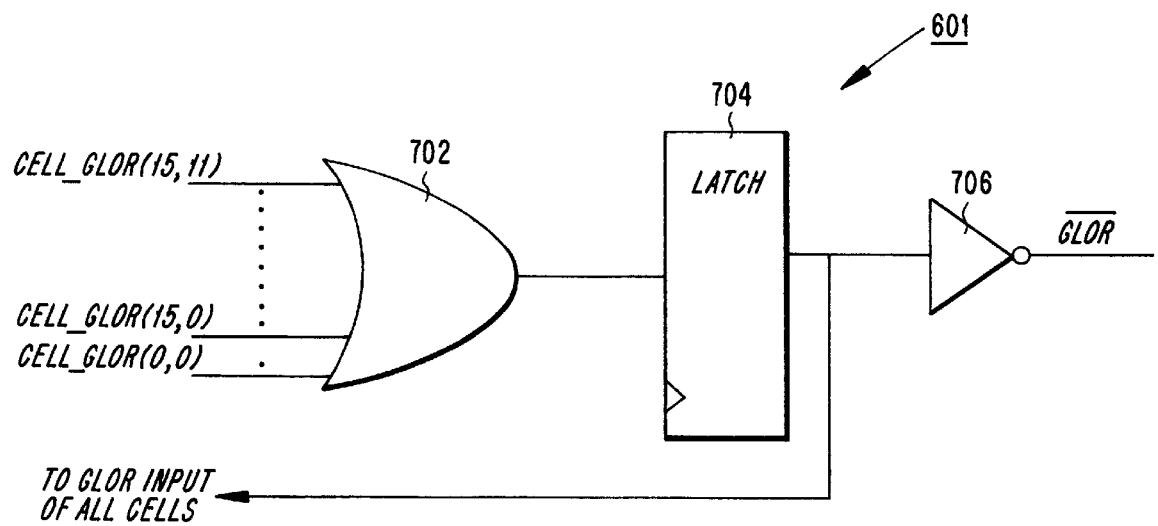
FIG. 7 shows an implementation of the Global OR function in accordance with one embodiment of the present invention.

As shown in FIG. 7, the logical OR operation is performed by OR function 702. The output of the OR function 702 is latched into a register 704. The output of register 704 represents the chip GLOR signal that is fed back into every processing cell 301 in the SIMD component array to affect cell operation as described above. The chip GLOR signal is also fed to the input of an inverting driver 706 to produce an inverted GLOR signal (active low).

The chip GLOR 601 can be used to extract processing results. Much of the post processing performed on the results of SIMD component 110 processing involves the extraction of particular data values from the entire output image. The chip GLOR 601, through output to external circuitry, can be used to extract this "target" data with coordinate data appended.

Boundary Scan

Boundary scan hardware 610 is provided to eliminate the need for test points between devices and enhance overall testability and fault isolation of the SIMD component 110. Boundary scan hardware 610 consist of a set of registers and multiplexors on each I/O cell which are connected as a serial chain. Test patterns can be shifted into the SIMD component 110 via this path and results can be shifted out. The boundary scam hardware 610 isolates the internal processing cell array from the external I/O in order to allow independent testing of each. Because boundary scan provides its own data path, the SIMD component 110 interface paths do not need to be operational for testing purposes and, therefore, faults can be isolated in them.

The following signals are defined to support a boundary scan test capability for the SIMD component 110:

BSCLK 611—Boundary Scan Clock

BSCLK 611 is a clock input dedicated to clocking test registers in the periphery of the component to allow for shifting in of test patterns and data and extracting results for the Boundary Scan test operations. Boundary scan operations are synchronized to the rising edge of this clock.

BSCTL 612—Boundary Scan Control Select

The BSCTL 612 signal is a latched input that selects between loading boundary scan control information or loading test data to the SIMD component 110.

BSIN 613—Boundary Scan Input

The BSIN 613 signal is a latched input that is used to input boundary scan test commands or data into the SIMD component 110. This signal can either be connected to the BSOUT 614 signal of another SIMD component 110 up stream in the daisy chain, or to the BSIN 613 input for the parallel processor array 101.

BSOUT 614—Boundary Scan Output

The BSOUT 614 signal is a latched output that is used either to extract test data from the SIMD component 110 for test verification or to shift out test data/commands to the next SIMD component 110 in the boundary scan daisy chain. This signal can either be connected to the BSIN 613 signal of another SIMD component 110 down stream in the daisy chain or to the BSOUT 614 output of the parallel processor array 101 circuit board if the particular SIMD component 110 is the last in the boundary scan chain.

SIMD Component Input/Output (I/O)

The SIMI) component contains I/O circuitry 620 in the form of latched inputs, output registers, and bidirectional input/output (I/O) circuits.

SIMI Component Inputs

In the preferred embodiment, the CW[23:0] 216, WADR [7:0] 208, AADR[7:0] 204 and BADR[7:0] 206 inputs are all latched inputs.

At each rising edge of the clock, each of these inputs loads the data presented to it from outside the SIMD component 110, and transmits it to all affected logic within the SIMD, component 110.

Each of the latched inputs has the capability of driving the inputs of all 192 processing cells 301 in the array.

SIMD Component Output Register

The chip GLOR signal at the output of inverting driver 706 is a latched output that is active low.

SIMD Component Bi-Directional I/O Circuitry

Each of the image bus paths into an d out of the I/O cells of the SIMD component 110 internal array is interfaced with a bidirectional transceiver. The NO 315/NI 314, SO 317/SI 316, EO 319/EI 318, and WO 321/WI 320 signal pairs for all of the I/O cells of FIG. 6 become the N[15:0], S[15:0], E[11:0], and W[11:0] bidirectional buses of FIG. 2 after passing through the bidirectional I/O circuitry shown in FIGS. 8a and 9.

Figure 9:
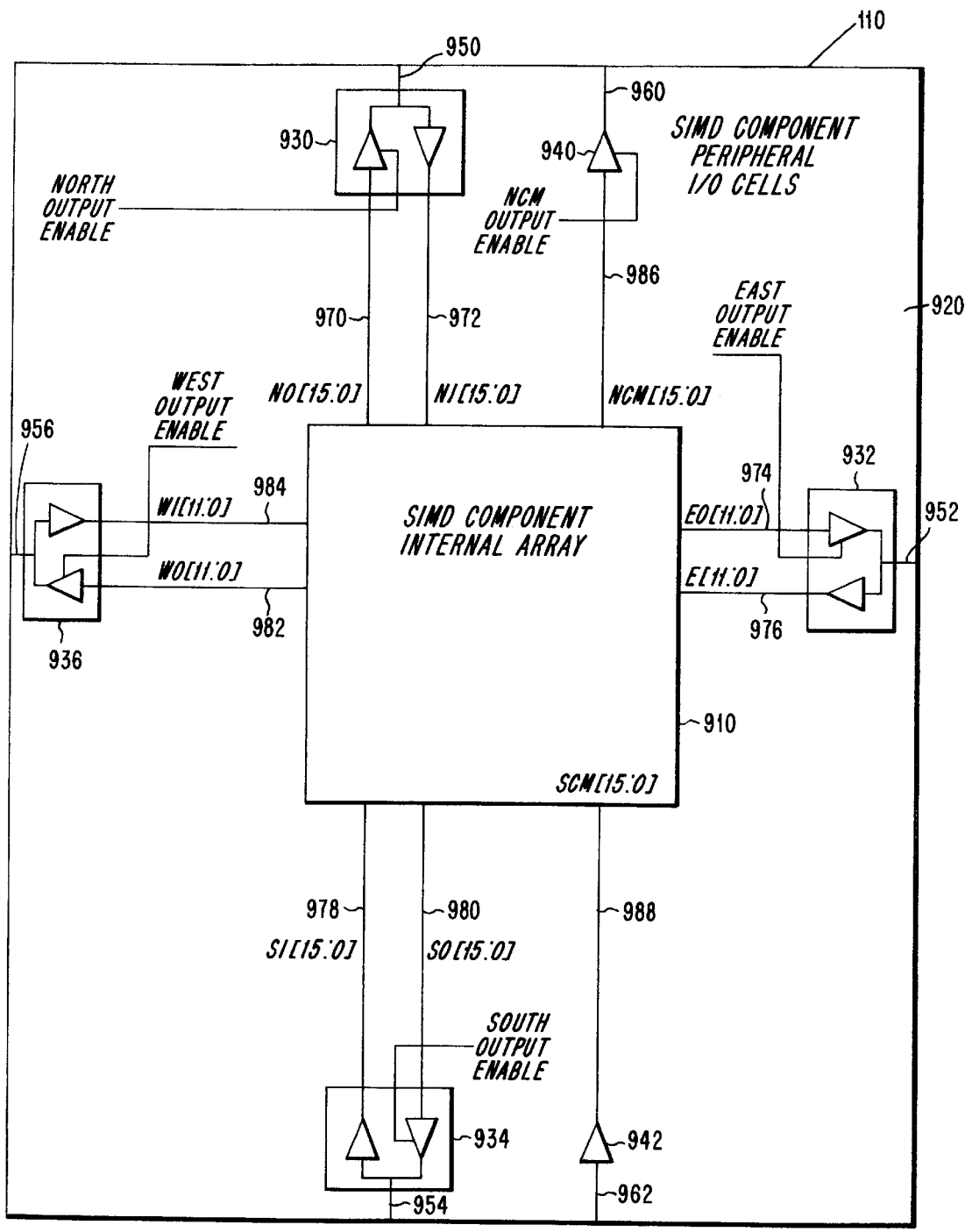
FIG. 9 shows one embodiment of the bidirectional multi-bit image buses and the unidirectional multi-bit communication buses in accordance with the present invention.

FIG. 9 shows the bidirectional I/O circuits 930, 932, 934, 936 and the unidirectional I/O circuits 940, 942 which combine the single bit unidirectional internal image buses 970, 972, 974, 976, 978, 980, 982, 984 and communication buses 986, 988 from the internal array of processing cells 910 to form the bidirectional mult-bit image buses 950, 952, 954, 956 and the unidirectional multi-bit communication buses 960, 962 that can be connected to corresponding buses in neighboring SIMD components 110.

Figure 8A:
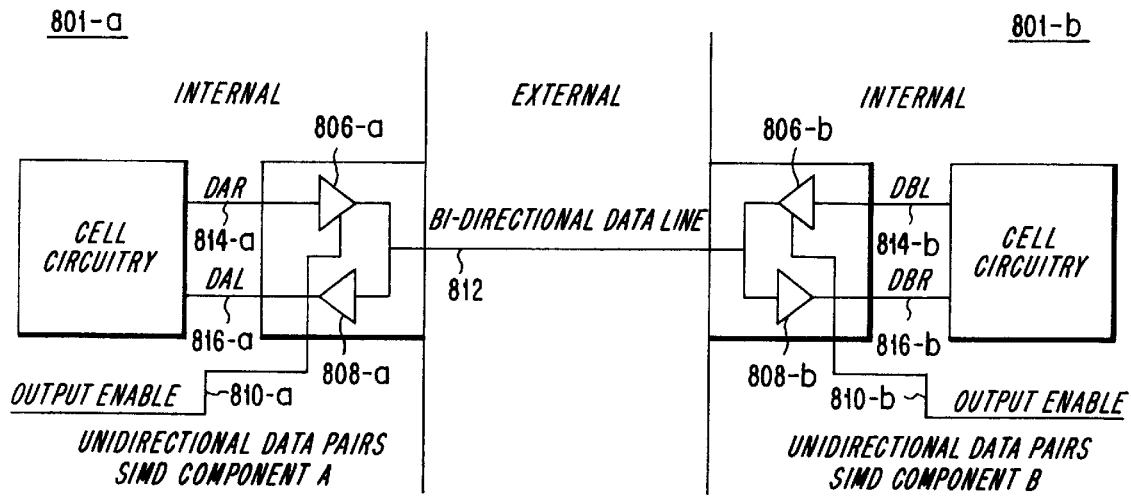
FIGS. 8a and 8b show, respectively, a generalized bi-directional interface in accordance with one embodiment of the present invention, and a timing diagram of signals on the bi-directional interface during a change in transmission direction.

FIG. 8a shows a generalized bi-directional interface. Processing cell 801-a lies on the periphery of an array of cells in the component a (not shown). Processing cell 801-b lies on the periphery of SIMD component b (not shown). In FIG. 8a, these two processing cells are connected by a bidirectional image bus 812, which may run in either the north-south or east-west direction. The bidirectional bus 812 allows data to be shifted from cell 801-a to 801-b or from 801-b to 801-a.

The direction of data flow on bidirectional bus 812 is determined by the NS direction decode logic 464 or the EW direction decode logic 466, from which the appropriate output enable signals 810-a and 810-b are generated. When the direction decode logic indicates a shift of data from cell 801-a to 801-b, the output enable signal 810-a is asserted, the output enable signal 810-b is deasserted, and the data is supplied from cell 801-a, via DAR 814-a and the bidirectional bus 812 to cell 801-b via the DBR 816-b signal. When the direction decode logic indicates a shift of data from cell 801-b to 801-a, the output enable signal 810-b is asserted, the output enable, signal 810-a is deasserted, and the data is supplied from cell 801-b, via DBL 814-b and the bidirectional bus 812 to cell 801-a via the DAL 816-a signal. When the direction decode logic indicates no shift operation, the output enables 810-a and 810-b are both deasserted, and the state of the bidirectional bus 812 is determined by a low drive hold circuit (not shown).

Figure 8B:
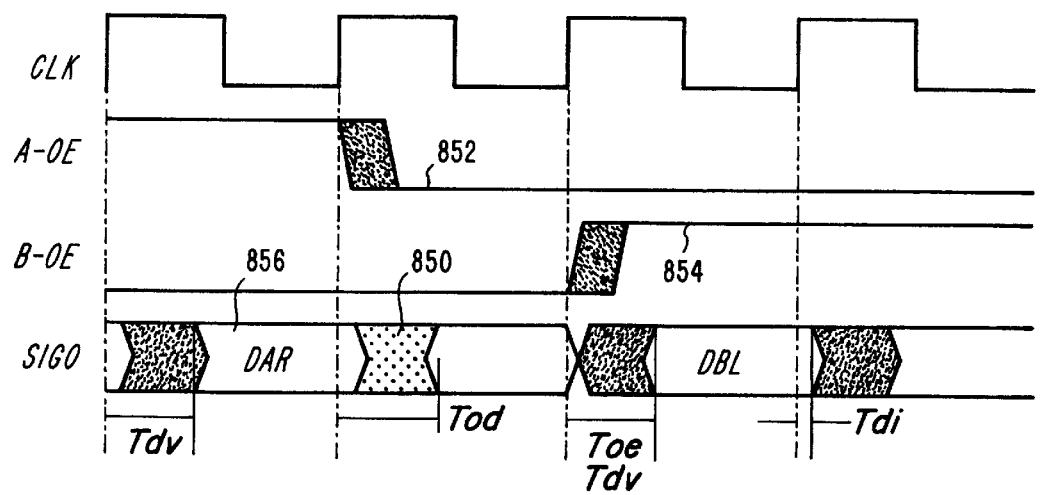

FIG. 8b describes the timing expected to be associated with direction changes for data transfer. In the figure, SIG0 may be a signal on any of the buses N[15:0] 950, S[15:0] 954, E[11:0] 952, and W[11:0] 956. Direction changes are shown with a one clock cycle delay added to allow the output drivers of one direction to be disabled before turning on the drivers from the other direction. This is to avoid contention between output drivers and to meet timing requirements.

When no transfers are taking place along the external buses 950, 952, 954, 956, 960, 962, they are preferably not allowed to float, but rather, the state of the signals are preserved. A low drive hold circuit (not shown) is preferably incorporated into the I/O circuits to hold the signal value to the present state when the output drivers in both directions are off. This hold circuit is weak enough to be easily overwhelmed by the output drivers to allow them to change the state of the signal without significant degradation in switching time or a significant increase in noise or power transients. Note that in region 850 the A output enable signal 852 is changing to a non-driving state, but a hold circuit (not shown) maintains the value of SIG0 856, which appears on the bi-directional image bus 812, until the B output enable signal 854 is asserted.

I/O Control

The bidirctional Image busses 950, 952, 954, 956 require special control logic for handling the turn around of electrical signals during changes in data flow directions. The direction of data flow on these buses is determined by the Command Word (CW). Referring back to FIG. 4, the North-South Direction decode logic (NS_Direction_Decode) 464, and the East_West Direction Decode logic (EW_Direction_Decode) 466 set the appropriate MUX positions in the processing cells 301. Note that upon power-up, the SIMD component 110 "comes up" with all bidirectional drivers disabled.

Image Buses

The direction of the Image buses 950, 952, 954, 956 are controlled by the following logic equations:

North Output Enable:=
   (CW[4:2]=(011)) OR (CW[15:14]=(11) AND CW[4:2]/=(010))

South Output Enable:=
   (CW[4:2]=(010)) OR (CW[15:14]=(10) AND CW[4:2]/=(011))

East Output Enable:=
   (CW[7:5]=(011)) OR (CW[17:16]=(11) AND CW[7:5]/=(010))

West Output Enable:=
   (CW[7:5]=(010)) OR (CW[17:16]=(10) AND CW[7:5]/=(011))

RAM Decoding Methodology

The addresses to the multiport RAM 434 are driven by the address registers on the SIMD component's 110 periphery and are the same to all processing cells 301 in the array. With all multiport RAMs 434 receiving the same address the decoding for the multiport RAM 434 may be done for a group of multiport RAMs 434 (such as a ROW or COLUMN) to avoid unnecessary repetition of the decode logic in each processing cell 301.

SIMD Component Interface Definition

The external signal terminals, with descriptions, for the SIMD component 110 are presented in this section. FIG. 2 shows the SIMD component 110 I/O signals and buses positioned in the desired manner around the die when viewed from above. All signals should comply with the D.C. and A.C. electrical specifications given below.

Image Buses

The bidirectional Image buses provide communications between cells of cascaded SIMD components 110. These include N[15:0] 950, S[15:0] 954, E[11:0] 952, and W[11:0] 956. These buses are extensions of corresponding processing cell internal buses described above, and allow for SIMD component arrays as large as desired.

SIMD components 110 located on the edges of a parallel processor array 101 may have their image bus pins connected, in a wrap around fashion, to the corresponding SIMD components 110 on the opposite edge of the parallel processor array 101. For example, the SIMD components 110 on the eastern edge of the parallel processor array 101 can have their east image bus pins connected to the west image bus pins of the SIMD components 110 on the western edge of the parallel processor array 101. The same also applies for wrap around of the north and south edges of the parallel processor array 101.

The image buses are capable of transferring data simultaneously in the north/south and east/west directions.

Communication Bus

The North and South communications bus paths (NCM[15:0] 220 and SCM[15:0] 221), allow the SIMD component 110 to interface with the external world. These buses may be coupled with input and output buffers, external RAM, or neighboring SIMD components 110. This provides a path for the system to shift data into or out of the multiport RAM 434 concurrently with the processing cell's 301 internal processing.

The Communication Bus 640 consists of a daisy chain interconnection of the north-south columns of processing cells 301 that allows data to be shifted into processing cells 301 from the southern-most edge of the array, and shifted out to the north edge of the array. Therefore, the SIMD components 110 located on the northern-most and southern-most edges of the array serve as I/O ports of the array.

Command Word

The SIMD component 110 command word inputs, CW[23:0] 216 provide external control for all SIMD component 110 internal functions as defined above in Table 1.

RAM Addresses

As described above, the multiport RAM 434 has two read address ports, and one write address port. These are now described.

Write ADdress port—WADR[7:0]

WADR[7:0] is an eight bit address that selects one of the 192 RAM locations in each processing cell's multiport RAM 434 for a write operation on the next rising edge of the clock.

A ADdRess Port—AADR[7:0]

AADR [7:0] is an eight bit address that selects one of the 192 RAM locations for all processing cells 301 within the SIMD component 110. The data stored at that location will appear at the ARAM output port of every processing cell's multiport RAM 434.

B ADdress Port—BADR[7:0]

BADR[7:0] is an eight bit address that selects one of the 192 RAM locations for all processing cells 301 within the SIMD component 110. The data stored at that location will appear at the BRAM output port of every processing cell's multiport RAM 434.

ClocK Input—CLK

The rising edge of the input CLK 212 triggers the storage of data in all of the processing cell registers and selected RAM storage locations within an array. The clock input to the SIMD component 110 should be a single phase clock whose rate determines the on-chip clock rate. The input for the CLK 212 is a high performance buffer, or set of buffers.

Power and Ground Pins

The $V_{CC}$ 202 and ground pins (GND) 203 are shown in FIG. 2. These provide Power distribution and signal references for the SIMD component 110.

The SIMD component 110 should have separate power/ground systems to isolate components that have large dynamic power transients from those that do not.

Preferably, the SIMD component 110 has a minimum of twenty GND 203 and sixteen $V_{CC}$ 202 pins which are evenly distributed on all sides of the component.

Primitives

Single bit operations, performed once per clock cycle, are repeated to accomplish arithmetic and logical operations for multiple bit operand data. These multiple bit operations, such as ADD or SUBtract, are known as primitives.

The primitives form a set of operations which should be sufficient for all image processing algorithms to be performed in applications using the SIMD component 110. Some of the primitives which can be supported by the SIMD component 110 are listed below.

| | | |
|---|---|---|
| 1) | INPUT | Input an image from an input buffer. |
| 2) | OUTPUT | Output an image to an output buffer. |
| 3) | AND | Return logical AND of two image operands. |
| 4) | OR | Return logical OR of two image operands. |
| 5) | XOR | Return logical XOR of two image operands. |
| 6) | ADD | Return arithmetic sum of two image operands. |
| 7) | SUB | Return arithmetic difference of two image operands. |
| 8) | COMPARE | Return sign of difference of two image operands. |
| 9) | FORK | Select one of two image operands. |
| 10) | ADDIF | Conditional sum of two image operands, masking B operand. |
| 11) | SUBIF | Conditional difference of two image operands. |
| 12) | IFADD | Conditional sum of two image operands, masking A operand. |
| 13) | CMP_NE | Indicate inequality of two image operands. |
| 14) | ABS | Return absolute value of single input image operand. |

These primitives are described in detail in the following paragraphs with reference to FIG. 4 and the SIMD component commands defined in Table 1.

Input and Output Primitives

The communications bus (CM) 120 comprises the unidirectional signals NCM[15:0] 220 and SCM[15:0] 221 which connect each SIMD component 110 to its neighbor. The bus CM 120 is utilized to load and store external data to and from the multi-port RAM 434. This is carried out by shifting data through the CM bus 120 and then into or out of the multi-port RAM 434. The CM_MUX 402 and RAM_MUX 406 are utilized to control this operation. Shifts on the CM bus 120 can operate concurrently with ALU 444 operations.

An input operation is accomplished by performing a series of bit plane input sequences. Each bit plane input includes a series of CM shift instructions (CM:=SCM). Specifically, the CM:=SCM instruction is performed once per row in the array dimension. During each shift, data is supplied from an external buffer and shifted into the CM registers in the southern most row of the array. Once bit plane input is complete, a RAM:=CM instruction is performed to store the bit plane into the SIMD component multiport RAM 434.

An output operation is similar to an input operation except that the data is shifted into an external buffer connected to the north edge of the array. Prior to shifting out a bit plane, a bit in each processing cell 301 is loaded into the CM_Reg 404 by performing a CM:=ARAM instruction (described above).

Input and output can be performed simultaneously by loading the bit plane for output with CM:=ARAM, performing SIMD component-array dimension CM shift instructions, and finally storing the input bit plane with RAM:=CM. During each shift instruction, a CM:=SCM instruction is performed, a row of data is supplied from an external buffer, and a row of data is written to an external buffer. Input and output data never contend since the bit planes shift in the same direction. One can visualize the input bit plane "pushing" the output bit plane out on the north edge of the array as it comes in on the south edge.

Logical Primitives

Logical primitives are performed by shifting operands through the A and B inputs of the ALU 444 and storing either the CO or PLUS outputs into the multiport RAM 434. As shown in Table 4, three logical operations are easily supported. The A_CMD and B_CMD signals must be set for no masking of operands by appropriate setting of the CW[23:21] bits. The CW[21] field may be used to invert the A operand.

Table 4 shows the required C_Reg 442 setup for each logic operation, and the identity of the ALU output where the result will appear.

TABLE 4

| Operation | C_Reg Setup | Source of Result |
|---|---|---|
| AND (A & B) | C: = 0 | CO |
| OR (A + B) | C: = 1 | CO |
| XOR (A XOR B) | C: = 0 | PLUS |

Arithmetic Primitives

Several arithmetic primitives are supported by the SIMD component 110. These primitives use the A, B and C inputs and the PLUS and CO outputs of the ALU 444. The command field CW[21] is used to convert the CO output from a "carry" to a "borrow" in order to perform subtractions. Table 5 shows the arithmetic operations which may be performed by the ALU 444.

TABLE 5

| Operation | CO_CMD CW [21] | A_CMD CW [22] | B_CMD CW [23] | C_MUX CW [10:8] | RAM_MUX/WE CW [13:11] |
|---|---|---|---|---|---|
| ADD | CARRY | AL | BL | CO | PLUS |
| SUB | BORROW | AL | BL | CO | PLUS |
| COMPARE | BORROW | AL | BL | CO | NO_WRITE (1) |
| FORK (4) | X (3) | AL + D | BL & D | C | PLUS |

TABLE 5-continued

| Operation | CO_CMD CW [21] | A_CMD CW [22] | B_CMD CW [23] | C_MUX CW [10:8] | RAM_MUX/WE CW [13:11] |
|---|---|---|---|---|---|
| ADDIF (2) | CARRY | AL | BL & D | CO | PLUS |
| SUBIF (2) | BORROW | AL | BL & D | CO | PLUS |
| IFADD (4) | CARRY | AL + D | BL | CO | PLUS |
| CMP_NE | X (3) | AL | BL | SET_NE | NO_WRITE (1) |
| ABS (5) | X (3) | AL | BL & D | SET_NE | PLUS |

Note: (1) Result in C register.
    (2) Condition stored in D.
    (3) X = don't care
    (4) Condition preloaded to C_Reg 442 and D_Reg 438
    (5) See text for details not included in table In Table 5, the first column represents the possible arithmetic operations. Each row corresponding to a particular arithmetic operation shows the necessary settings of the ALU_Logic 432 and of the C_MUX 440. The last column in Table 5 identifies the RAM write operation which must occur for each bit.

Each of the arithmetic primitives is now described in greater detail.

ADD/SUB Primitives

The ADD/SUB primitives permit the addition/subtraction of multi-bit wide data values utilizing the one bit wide ALU 444 associated with a processing cell 301. This is accomplished by shifting operands through the A and B inputs to the ALU 444 starting with the least significant bit (LSB) and proceeding to the most significant bit (MSB). The command field CW[21] determines whether the operation is to be an add or subtract by altering the function of the CO bit to be a carry for add operations (CW[21]=0) or a borrow for subtract operations (CW[21]=1).

The add or subtract operation takes N clock cycles for an N bit result. On each clock the ALU 444 receives the operand bits on its A and B inputs and produces a result at its PLUS and CO outputs. The value on the PLUS output is written to the multi-port RAM 434 and forms the arithmetic result while the value on the CO output is written to the C_Reg 442 in order to propagate the carry or borrow during the next iteration.

ADDIF/SUBIF Primitives

The ADDIF/SUBIF primitives represent, respectively, conditional add and conditional subtract operations. The operational steps for performing these primitives is the same as for the respective ADD and SUB operations described above except that for both the ADDIF and SUBIF operations, the D register is utilized as a conditional mask to determine, for each cell, whether the Add or Subtract is performed or whether the A operand data is passed straight through to the PLUS output of the ALU 444.

As a set-up to the ADDIF/SUBIF operations, the condition bit is taken from the C_MUX 440 and stored into the D_Reg 438. During shifting, the ALU_Logic 432 is controlled so that the output of the BL_Reg 430 is AND'ed with the output of the D_Reg 438, with the result being passed to the B input of the ALU 444. Where the output of the D_Reg 438 is a 1, then the ALU 444 performs the add or subtract operation exactly as described above with respect to the ADD and SUB operations. However, where the output of the D_Reg 438 is a 0, then the ALU 444 will add or subtract its A operand with 0, effectively passing the A operand to the PLUS output of the ALU 444. The result of the operation can then be written to the multi-port RAM 434.

COMPARE Primitives

The purpose of the COMPARE primitive is to produce a one-bit result which indicates whether the multi-bit value shifted through the B input of the ALU 444 is greater than the multibit value shifted through the A input of the ALU 444. Consequently, the operation of the COMPARE primitive is the same as the SUB operation described above, except that the difference is not written to the multi-port RAM 434. Instead, only the sign value of the difference is propagated. This sign value is stored into the C_Reg 442 upon completion of the primitive. If the resulting sign value equals 1, then the B operand is greater than the A operand. Otherwise, the A operand is greater than or equal to the B operand.

FORK Primitives

The FORK primitive allows for selection of the A or B operand depending on the value of a condition bit. The operand data is shifted through the ALU 444 with the result stored from the PLUS output of the ALU 444 to the multi-port RAM 434. The result is either the A or the B operand depending on the condition value stored in the D register.

As a set-up to the FORK operations, the condition bit is taken from the C_MUX 440 and stored into the D_Reg 438, and the C_Reg 442 on the same clock. During shifting, the ALU_Logic 432 is controlled so that the A operand is logically OR'ed with the mask value stored in the D_Reg 438, and the B operand is logically AND'ed with the mask value stored in the D_Reg 438. The result of this is that where the mask value is 0 the A operand is passed to the PLUS output of the ALU 444 and where the mask value is 1 the B operand is passed to the PLUS output of the ALU 444. The reason for this is as follows.

When the condition bit is 0 the B operand is blocked, due to the ALU_Logic 432 AND gating, and the B input to the ALU 444 becomes a zero. The A operand is passed to the input of the ALU 444, because the A operand has been OR'ed with 0. What appears at the PLUS output of the ALU 444 is the logical XOR of A, B, and C. Since B and C are zero for all iterations, the A operand is passed as the result on the PLUS output of the ALU 444.

On the other hand, when the condition bit is 1, the operand that gets passed to the A input of the ALU 444 is equal to 1 for all iterations, because the condition bit in the D_Reg 438 is Or'ed with the A operand in the ALU_Logic 432. The C input of the ALU 444 is also equal to 1 for all iterations, because the condition bit is also stored in the C_Reg 442. Consequently, the PLUS output of the ALU 444 can be represented by the equation:

| | | |
|---|---|---|
| PLUS | = | A_Input XOR B_Input XOR C_Input |
| | = | 1 XOR B_Input XOR 1 |
| | = | B_Input |

Continuing with the situation where the condition bit is 1, the B_Input in this case is equal to the B operand, because the ALU_Logic 432 AND's the output of the BL_Reg 430 with the condition bit stored in the D_Reg 438. Consequently, the B operand is passed as the result on the PLUS output of the ALU 444.

IFADD Primitive

The IFADD primitive is similar to the ADDIF primitive, except that the operand which is conditionally added uses the AL register instead of the BL register as a path to the ALU. The IFADD primitive is useful because it allows the conditional operand to be shifted in the north-south direction, whereas the conditional operand may only be shifted east-west in the ADDIF primitive. As with the ADDIF primitive, the IFADD primitive uses the D register to contain a condition mask to determine for each cell whether a normal add takes place, or if the B operand data is passed straight through to the PLUS output of the ALU 444. Where the mask data is 0, the operation is effectively A+B+0. Where the mask data is 1, the operation is effectively −1+B+1.

As a setup to the IFADD primitive, the condition bit is complemented and then stored into the C_Reg 442 and, via the C_Mux 440, into the D_Reg 438. During shifting, the ALU_Logic 432 is controlled so that the output of the AL_Reg 426 is OR'ed with the output of the D_Reg 438, with the result being passed to the A input of the ALU 444. Where the output of the D_Reg 438 is a 0, the ALU 444 performs the Add operation as described for the ADD primitive. However, where the output of the D_Reg 438 is 1, the A input to the ALU 444 will be all 1's, effectively adding a (−1) to the B operand, plus a carry-in (in C_Reg 442) of 1, such that the B operand is passed to the PLUS output of the ALU 444 unchanged. The result of the operation is written to the multi-port RAM 434.

CMP_NE Primitive

The CMP_NE (compare not-equal) primitive compares two multibit operands for equality and returns a 1 if the operands are not equal. Prior to performing the comparison of operand bits, the C_Reg 443 is loaded with a 0 to indicate that the two operands are equal so far. As the operand bits are shifted through the A and B inputs to the ALU 444, the C_Reg 442 is loaded from its SET_NE source. The SET_NE signal provides the value of the ALU PLUS output OR'ed with the current C_Reg 442 value. As long as the operand bits are equal, the C_Reg 442 will remain at 0, and the PLUS output will be 0, giving a SET NE value of 0. If, at any time, the operand bits are not equal, the PLUS output will be 1, providing a SET_NE value of 1, which is loaded to C_Reg 442. From this point until the end of the primitive, the SET_NE value will remain at 1 since the C_Reg 442 value is 1. At the end of the primitive, the C_Reg 442 contains the result of the compare.

ABS Primitive

The ABS primitive returns the absolute value of a single input image operand. The algorithm proceeds from the least significant bit to the most significant bit and returns all bits unchanged up to and including the first occurrence of a 1 in the operand. Each bit following the first occurrence of 1 is XOR'ed with the sign bit, which conditionally complements it to generate the absolute value result.

This algorithm is implemented by computing, for each result bit, the following expressions:

$P(0):=0$ $A(i):=N(i)$ XOR $(S^*$ and $P(i))$ XOR $P(i)$ $P(i+1):=P(i)$ OR $N(i)$ where $A(i)$ is bit i of the answer operand;

$N(i)$ is the bit i of the input operand;

$S^*$ is the complemented sign bit, i.e., (Not N(msb)); and $P(i)$ is a flag indicating the occurrence of a 1 in N previous to bit i.

During execution, the input operand N is propagated through register AL 426, the complemented sign bit $S^*$ is maintained in register BL 430, and the flag P is computed and kept in C_Reg 442 and D_Reg 438. The PLUS output of the ALU 444 is stored to the multiport RAM 434, with BL&D being selected as the B_CMD. Therefore, the PLUS output of the ALU 444 is expressed as (AL_Reg 426 XOR (BL_Reg 430 AND D_Reg 438) XOR C_Reg 442), which matches the expression for A above. The value of P is updated by storing the SET_NE source to C_Reg 442 and, via the C_Mux 440, to the D_Reg 438. Thus, the C_Reg 442 and D_Reg 438 are loaded with (A(i) OR P(i)). While this does not match the formula given above for P(i+1), the effect is the same, since A and N are the same value up to and including the first occurrence of 1 in N, and the value of A has no effect on P after that.

Recommended Operating Conditions

The recommended operating conditions for the SIMD component 110 are shown in Table 6.

TABLE 6

| Parameter | Symbol | Min | Nom | Max | Units |
|---|---|---|---|---|---|
| Supply Voltage | $V_{CC}$ | 4.5 | 5.0 | 5.5 | V |
| Junction Temperature Range | | −55 | | +110 | °C. |

Clock Frequency from 1 Mhz to 40 Mhz.

Input Rise-Fall Time ≦3 ns.

Outputs Loaded with $I_{OH}/I_{OL}$ maximum and 50 pf capacitance.

Clock Termination: Terminate to $V_{CC}$ rather than to GND to improve the rise time relative to the fall time.

D.C. Electrical Characteristics

The direct current (D.C.) electrical characteristics of the SIMD component 110 are shown in Table 7.

TABLE 7

| Over operating temperature and supply voltage ranges | | | | |
|---|---|---|---|---|
| Parameter | Symbol | Min | Max | Units |
| High-level output (TTL load) $I_{OH}$ = −4mA -- CM & GLOR | $V_{OH}$ | 2.4 | | V |
| High-level output (CMOS load) $I_{OH}$ = −100 μA | $V_{OHC}$ | $V_{CC}$ −0.4 | | V |
| Low-level output (TTL load) $I_{OL}$ = 8 mA -- CM & GLOR | $V_{OL}$ | | 0.4 | V |
| Low-level output (CMOS load) $I_{OL}$ = 100 μA | $V_{OLC}$ | | 0.4 | V |
| High-level input voltage (1) | $V_{IH}$ | 2.0 | $V_{CC}$ + 0.5 | V |
| Low-level input voltage (2) | $V_{IL}$ | −0.5 | 0.8 | V |

TABLE 7-continued

Over operating temperature and supply voltage ranges

| Parameter | Symbol | Min | Max | Units |
|---|---|---|---|---|
| High-level CMOS input (CLK & Image Buses) (1) | $V_{IHC}$ | 80% | $V_{CC} + 0.5$ | V |
| Low-level CMOS input (CLK & Image_Buses) | $V_{ILC}$ | −0.5 | 20% | V |
| High-level input current | $I_{IH}$ | −10 | 10 | uA |
| Low-level input current | $I_{IL}$ | −10 | 10 | uA |
| Output leakage current | $I_{OZ}$ | −50 | 50 | uA |

Notes: (1) Must tolerate 7.0 v input for 15 ns through 40 ohms.
(2) Must tolerate −3.0 v input for 15 ns through 40 ohms.
(3) TTL levels do not apply to the image buses (N, S, E, or W).

A.C. Electrical Characteristics

The alternating current (A.C.) electrical characteristics of the SIMD component 110 are shown in Table 8.

TABLE 8

| Parameter | Symbol | Min | Max | Units |
|---|---|---|---|---|
| Clock Operating Range (1) | $F_{CLOCK}$ |  | 40 | MHz |
| Clock Pulse Width (hi or lo) | $T_{PW}$ | 10 |  | ns |
| Clock Pulse Rise Time | $T_R$ |  | 5 | ns |
| Clock Pulse Fall Time | $T_F$ |  | 5 | ns |
| Input Hold From clock rising | $T_H$ | 0 |  | ns |
| Maximum Ground Bump (2) | $V_{OLP}$ |  | 0.5 | V |
| Maximum Vcc Bump (Voltage below Vcc) (2) | $V_{OHP}$ |  | 0.5 | V |
| Boundary Scan Clock | $F_{BS}$ |  | 1 | MHz |

Note: (1) Minimum Required Frequency Range - Actual part may exceed Specified Range.
(2) All internal flip-flops Toggling. Maximum number outputs transitioning from high to low. Outputs driving 1k ohm (500 ohms for CM & GLOR) to $V_{CC}$. Outputs loaded with 45 pf. Ground bump measured on quiet pin with respect to system GND.
(3) Rise and Fall Timing measured as time of transition from 10 to 90% Vdd and 90 to 10% Vdd respectively. Setup, Hold, and Pulse width are measured at appropriate $V_{IL}$ and $V_{IH}$ input levels. Minimum Output Enable is measured from CLK at $V_{IH}$ to appropriate $V_{OL}$ and $V_{OH}$ level of prior cycle's data. All output measurements made at $V_{OL}$ and $V_{OH}$ levels as appropriate.
(4) The clock transition should not have a slope of opposite polarity to the intended slope between the $V_{IL}$ and $V_{IH}$ levels.

Capacitance

The capacitance characteristics of the SIMD component 110 are shown in Table 9.

TABLE 9

| Parameter | Symbol | CPGA223 MAX | CLDCC MAX | Units |
|---|---|---|---|---|
| Input Capacitance | $C_{IN}$ | 14.5 | 7.5 | pf |
| Output Capacitance | $C_{OUT}$ | 15.0 | 10.0 | pf |
| I/O Capacitance | $C_{IO}$ | 16.5 | 10.0 | pf |
| Clock Input Capacitance | $C_{CLK}$ | 14.0 | 10.0 | pf |

Absolute Maximum Ratings

The absolute maximum voltage and temperature ratings of the SIMD component 110 are shown in Table 10.

TABLE 10

| | |
|---|---|
| Supply Voltage, Vcc | +5.0 VDC |
| Input Voltage Range . . . (note 1) | −0.5 VDC to +5.0 VDC |
| Output Voltage Range . . . (note 1) | −0.5 VDC to +5.0 VDC |
| Operating Free-air temperature range: | −55° C. to +125° C. |
| LtStorage Temperature Range: | −65° C. to +150° C. |
| Junction Temperature, $T_J$ | 150° C. |
| Lead Temperature During Soldering | 265° C. |

Note: 1) −3 VDC and +7.0 VDC for 15 ns with 40 ohm source impedance.
2) Minimum impedance from any output to GND of $V_{CC}$ is 40 ohms.

Design and Construction

Footprint

Figure 10:
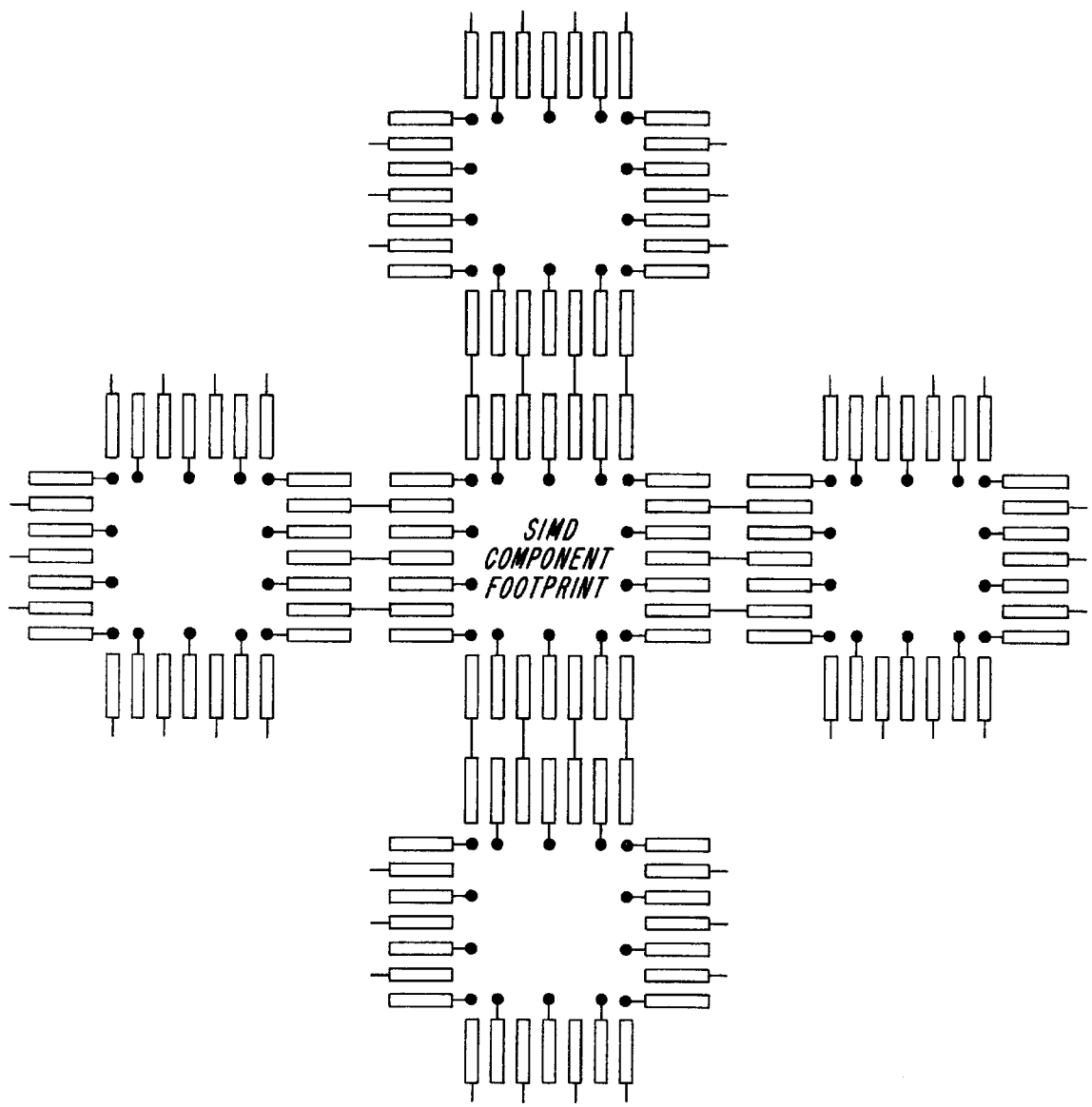
FIG. 10 shows an Adjacent Footprint Interconnect (AFI) method of laying out connector pins of a SIMD component in accordance with one embodiment of the present invention.

FIG. 2 shows the SIMD component 110 I/O signals and buses positioned in the desired manner around the die when viewed from above. The image buses 224, 226, 225, 277 and the communication bus 220, 221 are arranged so that they connect directly between adjacent components. Adjacent use signals route from footprint pads (without vias) to adjacent components. To support this interconnect methodology, these pins are located so that interconnecting vias for other signal/power/ground pins do not interfere with their direct interconnection. This connection method will be referred to as Adjacent Footprint Interconnect (AFI), and is depicted in FIG. 10.

The following is a list of AFI signals.

| | |
|---|---|
| N [15:0] | North Image Bus |
| S [15:0] | South Image Bus |
| W [11:0] | West Image Bus |
| E [11:0] | East Image Bus |
| NCM [15:0] | North Communications Bus |
| SCM [15:0] | South Communications Bus |

The remaining signals should be positioned to accommodate the above requirements. These remaining signals include:

| | |
|---|---|
| CW [23:0] | SIMD component command bus |
| AADR [7:0] | A RAM address bus |
| BADR [7:0] | B RAM address bus |
| WADR [7:0] | Write RAM address bus |
| CLK | Chip Clock |
| GLOR | Chip Global OR output |
| BSCLK | Boundary Scan Clock |
| BSCTL | Boundary Scan Control Select |
| BSIN | Boundary Scan Input |
| BSOUT | Boundary Scan Output |

Encapsulated Chip on Tape Package

The purpose of this package is to obtain the smallest possible package using an encapsulated TAB bonded chip. Specific requirements for the package are:

a. Tape design
   Tape automated bonding should be used to interconnect the chip directly to either a multi-chip package or an advanced substrate for chip on board packaging.
   The tape design should include provisions to allow full functional testing and burn-in of the chips on tape.

b. Wafer bumping
   Tape metallurgy should be compatible with gold bumped chip bond pads. Specific requirements for the wafer bumping are as follows:
   The bumping process should provide a titanium tungsten barrier layer and gold plating. Content for the barrier material should be 90% tungsten and 10% titanium. Thickness of the gold seal layer should be approximately 2000 A. The plated gold should be at least 99.99% pure and have an average height of 25 microns with a hardness between 55–75 knoop.

The tape design should be compatible with the latest JEDEC proposed standards. The minimum footprint pitch should be no smaller than 10 mils and should be compatible with either gold to gold thermocompression bonding or pulsed solder reflow.

c. Environmental chip protection

Environmental protection for the chips should be accomplished by combining the highest quality passivation with a secondary encapsulation of the chips on tape. Candidate materials include silicon nitride with low moisture absorption polymer materials. Specific materials should ultimately be able to obtain reliability levels which are greater than or equal to conventional hermetically sealed single chip packages.

Terms, definitions, and symbols

The terms, definitions and symbols used herein are defined in MIL-M-38510, which is incorporated herein by reference.

The invention has been described above in terms of specific embodiments merely for the sate of elucidation. No statement above is intended to imply that the above embodiments are the only fashion in which the invention may be embodied or practiced, and no statement above should be so construed. To the contrary, it will be readily apparent to one of ordinary skill in the art that it is possible to conceive of many embodiments not described above which nevertheless embody the principles and teaching of the invention. The invention should therefore not be limited to what is described above, but instead should be regarded as being fully commensurate in scope with the following claims.

What is claimed is:

1. A parallel processor comprising:
   control input means for receiving control signals; and
   a plurality of identical processing cells, each of the processing cells being connected to at least one neighboring cell and to the control input means for processing data in accordance with the control signals;
   wherein each of the processing cells comprises:
      memory means;
      a first register having an input and an output, the first register input being coupled to receive an output from the memory means during an instruction clock cycle;
      a second register having an input and an output; and
      an arithmetic logic unit having an input coupled to receive, during the instruction clock cycle, data from the second register output,
   and wherein further, for each of the processing cells, the second register input is coupled to receive, during the instruction clock cycle, the output from the first register located in one of the at least one neighboring cell.

2. A parallel processor according to claim 1 wherein, for each of the processing cells, the first register input is alternatively coupled to the memory means located within said each of the processing cells, or to the output of the first register located in the one neighboring cell in response to a control signal received by the control input means during the instruction clock cycle.

3. The parallel processor according to claim 1, further comprising control means, coupled to the control input means, for generating the control signals.

4. The parallel processor according to claim 1, wherein the control input means and the plurality of identical processing cells are fabricated as a very large scale integrated circuit chip.

5. A parallel processor comprising:
   control input means for receiving control signals; and
   a plurality of identical processing cells, each of the processing cells being connected to at least one neighboring cell and to the control input means for processing data in accordance with the control signals;
   wherein each of the processing cells comprises:
      a first operand source;
      a second operand source;
      a carry-bit source; and
      an arithmetic logic unit (ALU) including three inputs and an output, the three inputs being coupled, respectively, to the first operand source, the second operand source, and the carry-bit source, and the output selectively representing either a carry or a borrow result from, respectively, the addition and subtraction of the three inputs, in response to a first control signal received by the control means.

6. A parallel processor according to claim 5 wherein each of the processing cells further comprises an addressable memory means coupled to receive and store the carry/borrow from the ALU output in response to a second control signal received by the control input means,
   wherein:
      the addressable memory means comprises a plurality of storage locations and an address port for receiving an address signal, the address signal selecting one of the storage locations for use in a write or read operation of the addressable memory means; and
      the carry/borrow from the ALU output is routed to the addressable memory means without passing through any intervening clockable storage means.

7. A parallel processor according to claim 5 wherein the three ALU inputs and the ALU output are each single-bit values.

8. The parallel processor according to claim 5, further comprising control means, coupled to the control input means, for generating the control signals.

9. The parallel processor according to claim 5, wherein the control input means and the plurality of identical processing cells are fabricated as a very large scale integrated circuit chip.

10. A parallel processor comprising:
    control input means for receiving control signals; and
    a plurality of identical processing cells, each of the processing cells being connected to at least one neighboring cell and to the control input means for processing data in accordance with the control signals;
    wherein each of the processing cells comprises:
       an arithmetic logic unit (ALU) having an output representing a carry bit from an arithmetic operation; and
       addressable memory means coupled to receive and store the carry bit from the ALU output in response to a control signal received by the control input means,
    wherein:
       the addressable memory means comprises a plurality of storage locations and an address port for receiving an address signal, the address signal selecting one of the storage locations for use in a write or read operation of the addressable memory means; and
       the carry bit from the ALU output is routed to the addressable memory means without passing through any intervening clockable storage means.

11. The parallel processor according to claim 10, further comprising control means, coupled to the control input means, for generating the control signals.

12. The parallel processor according to claim 10, wherein the control input means and the plurality of identical processing cells are fabricated as a very large scale integrated circuit chip.

13. A parallel processor comprising:
control input means for generating control signals;
a plurality of identical processing cells, each of the processing cells being connected to at least one neighboring cell and to the control input means for processing data in accordance with the control signals; and
means for generating a global signal from a plurality of cell signals, each cell signal being generated by one of the plurality of identical processing cells;
wherein each of the processing cells comprises:
  means for generating a cell signal to be logically combined with similar cell signals from other processing cells to generate the global signal;
  global signal input means exclusively for receiving the global signal from the global signal generating means; and
  memory means coupled to receive and store the global signal from the global signal input means in response to a first control signal received by the control input means.

14. A parallel processor according to claim 13 wherein the means for generating a global signal is a logical OR gate.

15. A parallel processor according to claim 14 wherein each processing cell's means for generating a cell signal is responsive to a second control signal for generating a cell signal alternatively having a first value or a second value, the second value being the logical complement of the first value, whereby when the second control signal causes each processing cell to generate a cell signal having the second value, the global signal represents a logical NAND of all of the first values.

16. A parallel processor according to claim 13 wherein the memory means is an addressable memory means that comprises a plurality of storage locations and an address port for receiving an address signal, the address signal selecting one of the storage locations for use in a write or read operation of the addressable memory means.

17. The parallel processor according to claim 13, further comprising control means, coupled to the control input means, for generating the control signals.

18. The parallel processor according to claim 13, wherein the control input means, the plurality of identical processing cells and the global signal generating means are fabricated as a very large scale integrated circuit chip.

19. A parallel processor comprising:
control input means for receiving control signals; and
a plurality of identical processing cells, each of the processing cells being connected to at least one neighboring cell and to the control input means for processing data in accordance with the control signals;
wherein each of the processing cells comprises:
  a first operand source;
  a second operand source;
  a mask source;
  an arithmetic logic unit (ALU) having a first input and a second input; and
  mask logic means having a first input coupled to the first operand source, a second input coupled to the second operand source, a third input coupled to the mask source, a first output coupled to the ALU first input, and a second output coupled to the ALU second input, wherein the first output, in response to a first control signal received by the control input means, alternatively outputs a first operand that is received on the first input or the first operand logically OR'ed with a mask that is received on the third input.

20. The parallel processor according to claim 19, further comprising control means, coupled to the control input means, for generating the control signals.

21. The parallel processor according to claim 19, wherein the control input means and the plurality of identical processing cells are fabricated as a very large scale integrated circuit chip.

22. A parallel processor comprising:
control input means for receiving control signals; and
a plurality of identical processing cells, each of the processing cells being connected to at least one neighboring cell and to the control input means for processing single-bit data in accordance with the control signals;
wherein each of the processing cells comprises:
  means for generating a signal indicative of the equality of first and second multibit operands, and
wherein the means for generating a signal indicative of the equality of first and second multibit operands comprises:
  a first input for receiving a signal indicative of the equality of a selected bit from the first operand and a selected bit from the second operand;
  a second input for receiving a signal indicative of the equality of previously compared bits from the first and second operands;
  means coupled to the first and second inputs for generating a signal indicative of the equality of corresponding portions of the first and second operands, the corresponding portions comprising the selected bit and the previously compared bits from the first and second operands.

23. A parallel processor according to claim 22 wherein the means coupled to the first and second inputs for generating a signal indicative of the equality of corresponding portions of the first and second operands is a logical OR gate.

24. The parallel processor according to claim 22, further comprising control means, coupled to the control input means, for generating the control signals.

25. The parallel processor according to claim 22, wherein the control input means and the plurality of identical processing cells are fabricated as a very large scale integrated circuit chip.

26. A parallel processor comprising:
control input means for receiving control signals; and
a plurality of identical processing cells, each of the processing cells being connected to at least one neighboring cell and to the control input means for processing data in accordance with the control signals;
wherein each of the processing cells comprises:
  a multiplexor having first and second inputs and an output, the multiplexor selecting data at one of its inputs to appear at its output in response to a control signal generated within the processing cell, wherein the first input is coupled to an output of a multiplexor in one of the at least one neighboring cell, the second input is coupled to a local data source, arid the output is coupled to a first input of a multiplexor in one of the at least one neighboring cell.

27. A parallel processor according to claim 26, wherein the local data source is a register output.

28. The parallel processor according to claim 26, further comprising control means, coupled to the control input means, for generating the control signals.

29. The parallel processor according to claim 26, wherein the control input means and the plurality of identical processing cells are fabricated as a very large scale integrated circuit chip.

* * * * *